US006487600B1

(12) United States Patent
Lynch

(10) Patent No.: US 6,487,600 B1
(45) Date of Patent: Nov. 26, 2002

(54) SYSTEM AND METHOD FOR SUPPORTING MULTIMEDIA COMMUNICATIONS UPON A DYNAMICALLY CONFIGURED MEMBER NETWORK

(76) Inventor: Thomas W. Lynch, 4711 Spicewood Springs Rd. #229, Austin, TX (US) 78759

( * ) Notice: Subject to any disclaimer, the term of this patent is extended or adjusted under 35 U.S.C. 154(b) by 0 days.

(21) Appl. No.: 09/370,538

(22) Filed: Aug. 9, 1999

Related U.S. Application Data

(60) Provisional application No. 60/100,066, filed on Sep. 12, 1998.

(51) Int. Cl.[7] .............................................. G06F 15/16
(52) U.S. Cl. ....................... 709/229; 709/204; 709/225; 713/201
(58) Field of Search ................................ 709/249, 225, 709/227, 204, 229; 713/201

(56) References Cited

U.S. PATENT DOCUMENTS

| | | | | |
|---|---|---|---|---|
| 5,495,479 A | * | 2/1996 | Galaand et al. | 370/404 |
| 5,822,529 A | * | 10/1998 | Kawai | 709/219 |
| 5,964,837 A | * | 10/1999 | Chao et al. | 709/224 |
| 5,991,807 A | * | 11/1999 | Schmidt et al. | 709/225 |
| 6,041,343 A | * | 3/2000 | Nguyen et al. | 709/203 |

(List continued on next page.)

FOREIGN PATENT DOCUMENTS

EP 000426599 A2 * 10/1990 ........... G06F/15/16

OTHER PUBLICATIONS

Levine et al., Windows 98: The Complete Reference, McGraw–Hill, 1998, chapters 29–30, from http://library.books24x7.com.*

Kyoo et al., Distributed Routing Using Topology Databse in Large Computer Networks, 1988, IEEE CH2534–6/88/0000–0593, pp. 593–602.*

Michot et al., Global View Regarding Links of a Wireless Local Area Network, 1995, IEEE 0–7803–3002–1/95, pp. 891–895.*

*Primary Examiner*—Glenton B. Burgess
*Assistant Examiner*—Bradley Edelman
(74) *Attorney, Agent, or Firm*—Bruce Garlick

(57) ABSTRACT

A dynamically configured user network services a plurality of network members. A metanetwork definition identifies the members of the dynamic manifest network and provides the rules by which the network members establish links among themselves and communicate. Each of the network members employs a client communication device to communicate with another network member according to the metanetwork definition. Another centrally located computer, a network friend, may assist in setting upon and managing the dynamic manifest network via creating and altering the metanetwork definition. At a minimum, each client communication device includes a network interface, a processor and an interface to a coupled computer or to a client. The client communication device may include a voice interface, a display, a disk drive (or other storage), a network interface and other components. The client communication device may take differing forms to provide telephone functions and PC functions along with the communication functions it provides. The network friend has the basic structure of a web server and may facilitate transactions via the Internet and/or the PSTN. A metanetwork definition is setup by an initiating network member. The metanetwork definition defines the dynamic manifest network and how communications will occur within the dynamic manifest network. A local view of the metanetwork is then created for each network member. A respective local view of the metanetwork is then provided to each network member. Each network member then establishes links with other network members and communicates with the other network members according to the local view.

20 Claims, 23 Drawing Sheets

U.S. PATENT DOCUMENTS

| | | | |
|---|---|---|---|
| 6,055,575 A | * 4/2000 | Paulsen et al. | 709/229 |
| 6,115,753 A | * 9/2000 | Joens | 709/242 |
| 6,141,325 A | * 10/2000 | Gerstel | 370/238 |
| 6,178,172 B1 | * 1/2001 | Rochberger | 370/395 |
| 6,212,563 B1 | * 4/2001 | Beser | 709/227 |
| 6,246,669 B1 | * 6/2001 | Chevalier et al. | 370/238 |
| 6,256,663 B1 | * 7/2001 | Davis | 709/204 |
| 6,304,556 B1 | * 10/2001 | Haas | 370/254 |
| 2001/0033548 A1 | * 10/2001 | Saleh et al. | 370/218 |

\* cited by examiner

| META NETWORK 1 - 502 | | | |
|---|---|---|---|
| MEM ID | CONTACT INFO | CALLABLE PEERS | COMMUNICATION RULES |
| 1 | (512) 794-3678, 235.356.395.325 | 2, 3, 4, 7, 8, 9 | 2T7B4, 3T4B2, 4T8B2, 7T13B2, 8T3B4, 9T27B3 (CST7B9) |
| 2 | (512) 266-9876 267.386.105.235 | 1, 3, 4, 5, 6, 7, 8, 9 | 1T7B3, 3T4B2, 4T8B2, 7T9B2, 8T3B4, 9T12B3 (CST4B2) |
| 3 | (305) 345-2365 267.378.122.288 | 1, 2, 9 | 1T4B3, 3T4B4, 9T7B3 (CST12B1) |
| * * * * * * | | | |
| 9 | (248) 974-3654 728.845.258.786 | 1, 2, 3, 4, 5, 8 | 1T27B4, 2T12B2, 4T8B2, 4T13B2, 5T3B4, 8T27B3 (CST2B2) |
| META NETWORK 2 - 504 | | | |
| * * * * * * | | | |
| * * * * * * | | | |
| * * * * * * | | | |
| * * * * * * | | | |
| META NETWORK N - 506 | | | |
| * * * * * * | | | |

LOCAL VIEW
CST7B9

| PEER ID | TEL. NO(S). | SUGGEST. RULE | BACKOFF RULE |
|---|---|---|---|
| 2 | (512) 266-9876<br>267.386.105.235 | T7 | B4 |
| 3 | (305) 345-2365<br>267.378.122.288 | T4 | B2 |
| 4 | (214) 354-2235<br>879.879.587.658 | T8 | B2 |
| 7 | (971) 323-7975<br>478.258.369.147 | T13 | B2 |
| 8 | (972) 898-3463<br>789.456.123.598 | T3 | B4 |
| 9 | (248) 974-3654<br>728.845.258.786 | T27 | B3 |

FIG. 13

SYSTEM AND METHOD FOR SUPPORTING MULTIMEDIA COMMUNICATIONS UPON A DYNAMICALLY CONFIGURED MEMBER NETWORK

CROSS-REFERENCE TO RELATED APPLICATION

The present application claims priority pursuant to 35 U.S.C. Sec. 119(e) to U.S. Provisional Application Ser. No. 60/100,066, filed Sep. 12, 1998, pending, which is hereby incorporated herein by reference in its entirety.

BACKGROUND

1. Technical Field

The present invention relates generally to the field of networked computers and telephones; and more particularly to a system and method that supports multimedia communications across at least one communication network.

2. Related Art

Computer networks are generally known in the art to service computer to computer communications. In a computer network, communication paths/links provide an electronic path between computers over which electronic information is passed. A group of computers connected by one or more communication links therefor form a computer network. Computer networks support a great variety of electronic information exchange tasks, such tasks including the transfer of data files, the transfer of electronic communications, video teleconferencing, remote tasking, and many other computer related functions.

Computer networks have not always been readily available and they have not always been easy to use. When computers were first created, they were stand-alone devices that performed functions for particular local users. As the capability of computers increased and many organizations acquired computers, the ability to pass data between different computers was required. Thus, techniques were devised to intercouple computers. Further, techniques were devised to allow multiple users to access a single computer, such "time sharing" a form of networking users. Some installations used RS232 serial lines to couple large numbers of remote terminals to a central computer. Such networking of remote terminals to shared central resources allowed employees to share programs and data on the central computer. Further, computers were also intercoupled by leased telephone lines so that computers could share data with one another. These intercomputer communications were extensively managed so that they were relatively secure and reliable.

As technology progressed, users began to favor the use of smaller computers, e.g., personal computers (PCs), instead of centrally located computers. However, because PCs were stand-alone machines that typically supported a single user, data and program sharing was difficult. Typically, a transportable medium such as a diskette was used to pass data between PCs. To address this issue, local area networks (LANs) became popular for linking proximately located PCs. A LAN is a tight network of related machines that are typically confined to a room or a building, and hence are considered to be local to one another. Needs also arose to couple PCs of remotely located offices, each of which had a LAN. The wide area network (WAN), which is a variation of a local area network, was introduced to meet this need. WANs include links which intercouple remotely located separate machines or remotely located separate LANs. The WANs most commonly used dedicated leased telephone lines supporting services such as ISDN, Frame Relay and ATM to couple the remote locations. Thus, both LANs and WANs are private computer networks that serve the particular communication requirements of a managed organization.

As usage of PCs proliferated, many users desired to communicate with other users. However, these users were not connected by a LAN or WAN. In response to this need, service providers such as AOL, Prodigy, Compuserve and others established private computer networks that could be accessed for a fee. These networks allowed subscribers to exchange data and also to archive substantial amounts of information that was made available to other subscribers. These services initially started as bulletin board services (BBSs) with BBS network links typically implemented using plain old telephone lines and modems via a dial-up connection. While a modem bank operated by the BBS service provider had a fixed location, subscriber calls could originate from any location. The BBSs facilitated data exchange among the subscribers to the BBSs. However, access to the BBSs was limited to the subscribers to the BBS.

To provide more flexibility in computer to computer communications, various open networks were created over the years to service computer communications. Examples of these open networks include, for example, FIDONET, AOL, ARPANET, USENET, COMPUSERVE, and the Internet. The Internet is in many ways the culmination of the evolution of these open networks. These various open networks employed differing techniques to support computer to computer communications. FIDONET, for example, was a network of a large number of loosely collected machines that used the public switched telephone network (PSTN) to link from machine to machine. Each computer contained tables of addresses and phone numbers of the various FIDONET members that allowed the computer to communicate with other FIDONET members. Data was passed from machine to machine via phone calls over the PSTN until it finally reached its destination member. Each machine used a local configuration table to determine the destination for the next hop. Six or more hops were not uncommon for data communications. Long distance calls would be needed when data was to change area codes etc.

USENET used a similar scheme of local routing tables and multiple hops, but the USENET network also included data pooling, which allowed high bandwidth leased lines to be used, when available, for data transfer. By using the high bandwidth leased lines, long distance telephone charges were minimized since the companies procuring the leased lines typically did not charge for using the "excess capacity" of the leased lines. ARPANET was a more fully developed network that was funded by DARPA and the NSF. It was the combination of ARPANET and USENET that lead to the formation of the Internet. Hence, FIDONET, USENET, ARPANET, and the Internet have many features in common since they service a network of general purpose computers and employ multiple hops for data to move from a source to a destination.

All of these conventional networks have many serious shortcomings. For example, FIDONET, USENET, ARPANET, and Internet, all cause data to be exposed to numerous general purpose computers while it is being routed. These general purpose computers may be running programs such as sniffers which look for credit card numbers or which copy messages for possible dissemination. Due to the multiple hops, data may be lost. Also, as the origin of the data becomes ambiguous, senders can easily be anonymous or lie about their identity, reducing the risk of their being found out for violating privacy. As examples, it is not uncommon for an email message to be lost without the sender learning that it never reached its destination, and it is not uncommon to receive mail from a spammer and not be able to tell where it came from. All of these items make commerce on such networks as the Internet difficult to accomplish in a simple and secure manner. Further, buffering and pooling of data produces latencies in data transmission that make the transfer of real time information such as audio and video difficult. So again, simple actions such as sending a video phone call, listening to a news broadcast, viewing motion graphics, are all very difficult to perform on networks such as the Internet.

Thus, there is a need in the art for a communication device and supporting network infrastructure that overcomes these shortcomings and others related to computer communications.

Terminology

Various terminologies are unique to the description of the present invention. A "dynamic manifest network" is a computer network having a plurality of "network members" communicating with one another through dynamically created "channels." These channels are also referred to as "links." Once created, these links form direct connections between network members. However, links in the dynamic manifest network may change (be created and destroyed) from moment to moment. Links may be established in a circuit switched network such as the Public Switched Telephone Network (PSTN), thus avoiding the need for special packet switching hardware that is used in other data networks. The links may also be established in a packet switched network such as the Internet. To distinguish a packet data network link from a circuit switched network "link", a packet data network link may be identified as a "pseudo link." The term "call" is also used herein to describe the creation of a link via the PSTN or another network.

A "metanetwork" is a computer representable mathematical model of the dynamic manifest network. This model is used for analysis and optimization of a dynamic manifest network, for control of a dynamic manifest network and for other purposes relating to the dynamic manifest network. A "local view" of a dynamic manifest network is control information derived from the metanetwork that is appropriate for a single node in the dynamic manifest network. Thus, each network member uses its local view to direct link formation and subsequent communication to other network members. The local view contains "communication rules," "structure information," and other items that guide the functionality of the network members.

SUMMARY OF THE INVENTION

Thus, to overcome the shortcomings of the prior devices, as well as other shortcomings, a dynamically configured user network according to the present invention services a plurality of network members. A metanetwork definition identifies the members of the dynamic manifest network and provides the rules by which the network members establish links among themselves and communicate. Each of the network members employs a client communication device to communicate with another network member according to the metanetwork definition. Another centrally located computer, a network friend, may assist in setting upon and managing the dynamic manifest network by creating and altering the metanetwork definition. Management functions include receiving feedback from dynamic manifest members and using the feedback to modify the metanetwork definition.

At a minimum, each client communication device includes a network interface, a processor and an interface to a coupled computer or to a client. The client communication device may include a voice interface, a display, a disk drive (or other storage), a network interface and other components. The client communication device may take differing forms to provide telephone functions and PC functions along with the communication functions it provides. The network friend has the basic structure of a web server and may facilitate transactions via the Internet and/or the PSTN.

A metanetwork definition is setup by an initiating network member. Setup operations may be performed in a standalone mode or via interaction between the initiating network member and a network friend. In setting up a dynamic manifest network, a plurality of network members are identified, communication rules among the network members are established and a metanetwork definition is created for the dynamic manifest network from this information. The metanetwork definition defines the dynamic manifest network and how communications will occur within the dynamic manifest network. A local view of the metanetwork is then created for each network member. A respective local view of the metanetwork is then provided to each network member. Each network member then establishes links with other network members and communicates with the other network members according to the local view.

In one operation, all dynamic manifest network links are established across the PSTN, which provides security advantages not available by using the Internet. Thus, communications across the links are inherently secure based upon the communication network employed. Further, authentication rules are set in place so that, prior to the exchange of a communication between network members across a link (two network members) the network members authenticate each other. Further, once the network members have authenticated each other, encryption/decryption rules may be enacted to further secure the communications across the link.

In other embodiments, communications pass across other networks as well, including the Internet. In such operations, if the networks are inherently unsecure, such as the Internet, techniques must be employed to enhance the security of the link. Encryption/decryption techniques may be employed in which at least one token is provided across a secure link and used for communications passing across the Internet. In other operations, the links are managed so that the risk of communications being intercepted upon the Internet in a useful form is substantially reduced.

Moreover, other aspects of the present invention will become apparent with further reference to the drawings and specification, which follow.

BRIEF DESCRIPTION OF THE DRAWINGS

FIG. 12 is a block diagram illustrating the structure of a plurality of metanetworks supported by a network friend, each of the metanetworks defining a particular dynamic manifest network;

FIG. 13 is a block diagram illustrating a local view of a metanetwork as contained on a network member of a dynamic manifest network, the local view employed by the network member to establish communications with other network members of the dynamic manifest network;

DETAILED DESCRIPTION OF THE DRAWINGS

Figure 1:
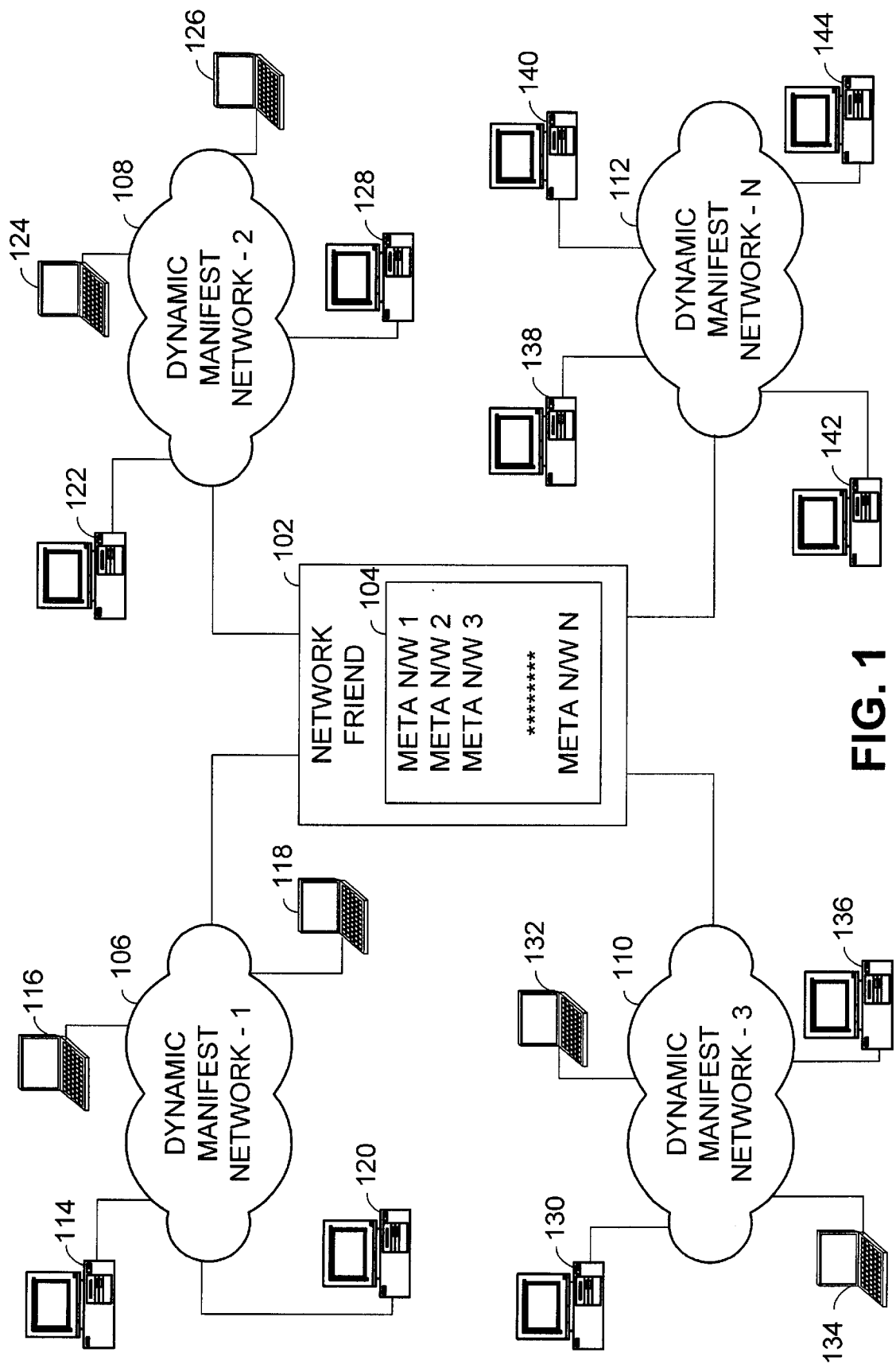
FIG. 1 is a system diagram illustrating a structure of a dynamically configured computer network constructed according to the present invention in which four sets of potential links form four distinct dynamic manifest networks, each supporting communications among a plurality of respective network members.

FIG. 1 is a system diagram illustrating a structure of a dynamically configured computer network constructed according to the present invention. In the diagram, four sets of potential links form four distinct dynamic manifest networks, each dynamic manifest network supporting communications among a plurality of respective network members. In the illustrated structure, a network friend 102 defines the plurality of metanetworks, the structure of each metanetwork stored in a metanetwork configuration 104. Each metanetwork represents the structure of a respective dynamic manifest network, such as dynamic manifest network 106, dynamic manifest network 108, dynamic manifest network 110 and dynamic manifest network 112. The dynamic manifest networks 106, 108, 110 and 112 may be formed across a single communication network, such as the PSTN or the Internet, or may be formed across two or more communication networks (as will be further described with reference to FIGS. 4, 5 and 11). As will be described further herein, in selecting communication network(s) upon which to form the dynamic manifest network, network availability, network characteristics (e.g., circuit switched, packet switched, loading, etc.) and other factors will be employed.

Each dynamic manifest network includes a plurality of network members. For example, dynamic manifest network 106 includes network members 114, 116, 118 and 120. Additionally, dynamic manifest network 108 includes network members 122, 124, 126 and 128, dynamic manifest network 110 includes network members 130, 132, 134 and 136 and dynamic manifest network 112 includes network members 138, 140, 142 and 144. Each network member supports link formation with other network members of the respective dynamic manifest network and with the network friend 102. According to the metanetwork configurations 104, network members of a particular dynamic manifest network do not support links from or to network members of other dynamic manifest networks. However, any particular computer may be a network member of more than one dynamic manifest network.

Link formation and subsequent communications among network members of a dynamic manifest network are accomplished directly from network member to network member without direct intervention of the network friend 102. However, the network friend 102 (in the described embodiment) does define the potential link structure of each dynamic manifest network and keeps track of such potential link structure(s) in the metanetwork configuration 104. Thus, when a network member initially joins a metanetwork, a local view of the dynamic manifest network that the network member joins is created from the metanetwork. The local view of the dynamic manifest network is then downloaded to the network member (or distributed via computer readable medium) to apprise the network member of the structure and communication rules for the dynamic manifest network. Subsequently, the network member establishes links with, and then communicates, with other network members of the dynamic manifest network according to the structure and communication rules. In another embodiment, however, the definition of the metanetwork is a collection of local views created and maintained by the network members. In such a structure, the network friend is not required.

The structure of the dynamic manifest network identifies network members and provides link establishment information that is used for establishing links between network members. Thus, for example, if network member 130 of dynamic manifest network 110 desires to communicate with a receiving network member 136, it first initiates link formation by calling network member 136. In one embodiment of a dynamic manifest network, links between network members are established according to the Integrated Services Digital Network (ISDN) protocol across the PSTN or similar network. Thus, in the embodiment, the call initiated by the network member 136 would be an ISDN call. Upon receipt of the call, network member 136 receives the caller ID of the calling network member 130 and determines whether the network member 130 is a network member of the dynamic manifest network 110 and whether it is appropriate to accept link formation at this time. The process of verifying the identity of the other network member is referred to as "authentication" and is performed by both the network member 136 and the network member 130. As a first step in authentication, the network member 136 inspects the local view and determines whether the caller ID of calling network member 130 corresponds to a network member contained in the local view. Additional authentication steps may be performed according to techniques that are further discussed with reference to FIGS. 18 through 20. If the authentication is positive, the calling network member 130 and receiving network member 136 establish a link and start the communication. This communication may be encrypted or unencrypted, depending upon the inherent security of a communication network being employed and the sensitivity of the subject of the communication.

Communication rules are employed to orchestrate operation of each of the dynamic manifest networks 106, 108, 110 and 112 of the dynamically configured computer network. The network friend 102 determines link formation rules for each dynamic manifest network based upon the particular communication requirements of the dynamic manifest network. The network friend 102 then creates suggestion rules and backoff rules for subsequent communications of the dynamic manifest network. The suggestion rules and backoff rules form a portion of the communication rules. Additional communication rules include, for example, time constraint rules, server choice rules, preference rules, emergency rules, operating mode rules and other rules. These communication rules are downloaded to the network members from the network friend 102 (or from a managing network member if a network friend is not employed). With the communication rules downloaded, the network members then initiate and complete link formation with other network members according to the communication rules and the other rules. However, the network members are not necessarily bound by the communication rules, even though they may be in some implementations.

In general, the suggestion rules are employed to schedule both the initiation and the receipt of calls. In performing such scheduling with the suggestion rules, particular times and/or particular time intervals are provided for link formation between network members. For example, in dynamic manifest network 108, a suggestion rule indicates that communications between network member 126 and network member 128 should occur at a time T1. According to the suggestion rule, network member 126 initiates a call to network member 128 at time T1 if it has data to send to network member 128. However, if network member 128 does not receive a call from network member 128 at time T1 (because network member 126 had no data to send to network member 128) and network member 128 has data for network member 126, according to the suggestion rule, network member 128 initiates a call to network member 126 at time T1+delta T. By creating the suggestion rules, communications between network members may be orchestrated in time. Further, orchestration in time provides an additional level of authentication assurance since attempts at link formation between network members at non-specified times may be rejected as non-authentic.

Backoff rules relate to operation when a call has been initiated but a busy signal has been received. For example, if network member 138 of dynamic manifest network 112 calls network member 144 but receives a busy signal or a network busy indication, the network member 138 may operate according to a backoff rule. According to one type of backoff rule, the network member 138 waits for a backoff period and then reattempts to call network member 144. However, according to another backoff rule, the network member 138 does not reattempt the call but waits to operate according to a suggestion rule for another time period. Of course, many other suggestion rules are possible.

In one implementation, the network friend 102 actively manages each of the dynamic manifest networks 106, 108, 110 and 112 using feedback from the network members. However, in another implementation according to the present invention, the network friend 102 operates only to initially setup the metanetwork. After formation, the metanetwork structure is distributed to the members of the metanetwork as the local views of the metanetwork. Any alterations thereafter to the metanetwork are accomplished via interaction with the network members themselves. In still another implementation, the metanetwork is created via interaction between the network members without activity of the network friend 102.

When a metanetwork is created without participation from the network friend 102, the network members communicate with one another to setup the metanetwork. In such case, one of the network members serves as a primary member of the dynamic manifest network. The primary network member creates, updates and maintains its local view of the metanetwork. The primary network member then accepts entry into the dynamic manifest network from other potential dynamic manifest network members. When the primary network member accepts a new network member, it modifies its local view accordingly. Further, the primary network member creates and provides a local view of a corresponding metanetwork to the new network member. In one operation, the primary network member retains only its local view of the metanetwork and creates local views of new network members from its own local view. However, in another operation, the primary network member creates and maintains a metanetwork for the dynamic manifest network and provides functions the same as, or similar to, the network friend. As operation continues, and if the primary network member desires to pass the its duties for managing the dynamic manifest network, it may pass these duties to another network member, making the other network member the new primary network member.

Generally speaking, at least three techniques exist for the creation of a network according to the present invention. Using a first technique, each potential network member manually enters its own local view of the network, which includes contact information for the other members of the network. In a second technique, an initiating network member contacts the network friend 102, requesting the network friend to establish a network which includes the initiating member and additional members identified by the initiating network member. The network friend 102 uses this partial information to complete formation of the network. In the third technique, a plurality of potential network members contact the network friend, requesting creation of a network. The network friend 102 correlates the requests to identify a plurality of network members and creates local views for each. Subsequently, the network members receive the local views either by contacting the network members. An alternative operation according to the third technique is when a primary network member assumes the responsibilities of the network friend 102.

Figure 2:
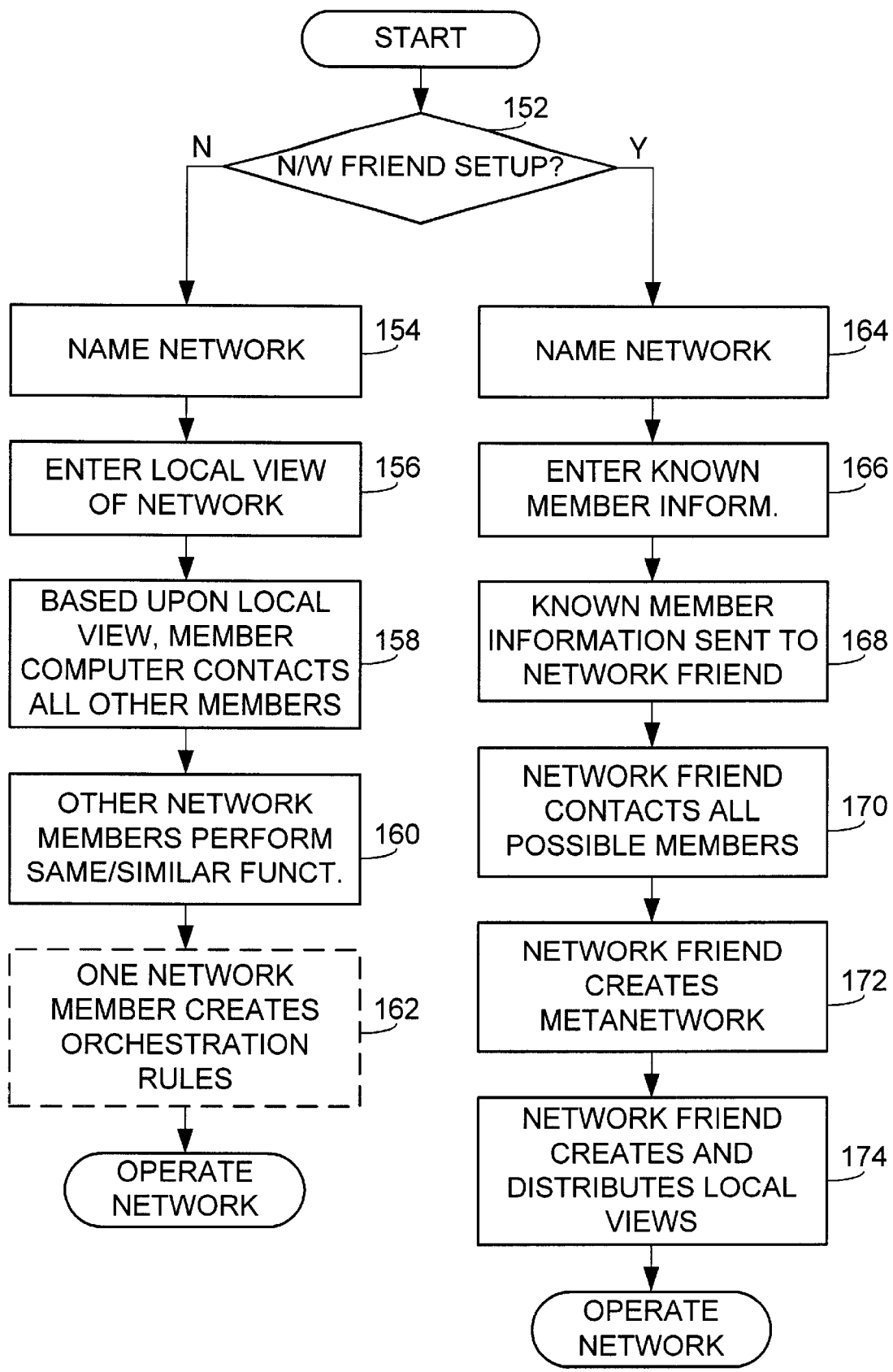
FIG. 2 is a logic diagram illustrating generally operation according to the present invention in establishing a network among a plurality of members.

FIG. 2 is a logic diagram illustrating generally operation according to the present invention in establishing a network among a plurality of members. Operation commences at step 152 wherein it is determined whether a network friend will assist in setting up the network. If no network friend will participate, operation proceeds to step 154 wherein the network is named by an initiating network member (the initiating network member may also be referred to as the "primary network member"). Then, at step 156, the initiating network member enters his or her local view of the network. Next, at step 158, based upon its local view provided by the initiating member, the initiating member contacts all other desired members of the network. The other desired network members then perform the same or similar functions at step 160. The combination of operations of step 158 and 160 allows all network members to communicate with one another to investigate and define the structure of the network, thereby forming a local view for each network member. In communicating with other the network members, communications may be centralized via the initiating network member. Alternately, each network member may contact more than one other network member.

In making these initial contacts, information may be exchanged that facilitates future authentication and encryption operations. Thus, initial communications should be accomplished via a trusted network connection, e.g., via the PSTN, a private network, via exchange of information on diskette, etc. that will minimize the risk to the network. Once these initial steps have been completed, operation will continue with greater security. The local views created during initial network setup, if combined, form a metanetwork for the dynamic manifest network. At optional step 162, orchestration rules for the dynamic manifest network are implemented. These orchestration rules may be created from default rules provided with the user software. The orchestration rules may be setup by the initiating network member, an assigned primary network member (if other than the initiating network member), or they may be setup by agreement of the members via interaction. From step 162, the network is operated and continues to operate.

If at step 152, it is determined that a network friend will assist in the creation of the network, operation proceeds to step 164 wherein an initiating network member names the network and provides the network name to the network friend. Then, at step 166, the initiating member collects known member information and, at step 168, the initiating member returns the known member information to the network friend. The network friend, based upon the known member information, and additional information it may determine from other sources, e.g., a search of available data records, contacts all possible network members at step 170. Based upon this contact, the network friend creates a metanetwork at step 172. Then, at step 174, the network friend creates local views for each network member and distributes the local views to the network members. The local views created may include orchestration rules. From step 174 the network operates according to the metanetwork.

Alternately, the network friend, based upon correlations of partial information received from a plurality of users requesting the creation of a network, determines that a particular set of users should be joined to form a network. In such case, the network friend creates local views of the network for the plurality of users. After a waiting period, the plurality of users that previously requested creation of the network contact the network friend and receive their local views of the created network. Then, the plurality of users operate according to the local views in communicating with one another. In an alternative operation, the network friend contacts the plurality of users to provide the local views.

Figure 3:
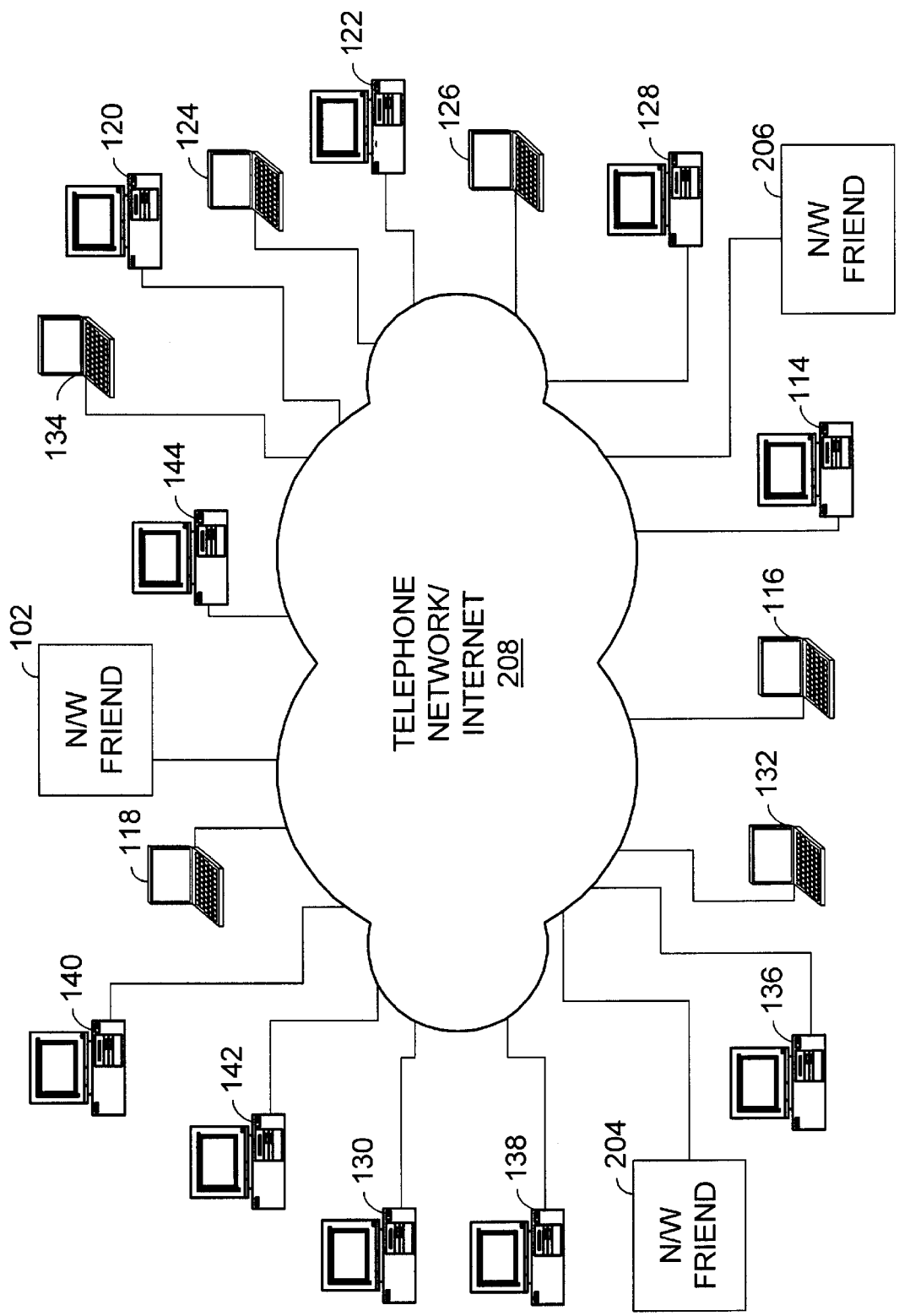
FIG. 3 is an alternate view of the dynamically configured computer network of FIG. 1 illustrating the use of a configurable telephone network/Internet for dynamic link formation.

FIG. 3 is an alternate view of the dynamically configured computer network of FIG. 1 illustrating the use of a configurable telephone network and/or the Internet for dynamic link setup and formation. As was previously described, a metanetwork is the creation of a network friend (or by one or more network members). Further, as was previously discussed, the dynamic manifest network operates generally according to local views of the metanetwork. As is shown, each of the network members 114–144 possesses a physical connection to a physical network (the telephone network/Internet 208) that is capable of coupling the network members 114–144 to one another. Thus, each network member, if ignoring the communication rules, could attempt to form a link with any other computer coupled to the telephone network/Internet 208. However, as was previously described with reference to FIG. 1, a network member receiving a call from a computer not in its local view (not a network member) would not accept the call because of the user authentication requirements associated with the local view. The structure of the metanetwork is enforced by both calling network members and receiving network members. Therefore, unlike the telephone network, the Internet and other publicly available networks that allow intercomputer communications with little or no limitations, connections between non-members are precluded.

In the dynamically configured computer network, control of the dynamic manifest networks exists at two levels. At an optional first level of control, the network friend defines the metanetwork, creates local views from the metanetwork and provides the local views to the network members. At a required second level of control, the network members employ the local views to establish links among one another to form the dynamic manifest network. In other words, smart terminal functions are employed to police operation of the communication networks.

The links over which communications pass are established only when communications between network members are required. Thus, each link is instantiated and paid for only when required. As compared to private networks in which a dedicated infrastructure is employed, operations according to the present invention require less connect time over the telephone network (when the telephone network is used for link formation). Further, because the connections are dynamic, it is more difficult to intercept communications between network members even as compared to a private network with dedicated infrastructure. As compared to a virtual private network (serviced over an open network such as the Internet) in which encryption is employed, the dynamically configured network of the present invention does not rely on encryption to ensure security. However, when communications are established over a substantially non-secure network, such as the Internet, encryption may be employed. Further, because of the authentication rules employed, communications from non-authenticated parties are not accepted, reducing the risk of hacking and other unauthorized entry.

Multiple network friends 102, 204 and 206 may be required to manage the dynamic manifest networks. In such case, each of the network friends 102, 204 and 206 is responsible for the management of a particular set of dynamic manifest networks. In assigning dynamic manifest networks to the network friends 102, 204 and 206, geographic proximity of users, loading and other factors are taken into consideration. The multiple network friends 102, 204 and 206 are also employed to increase reliability of the dynamically configured computer network. Should one of the network friends 102, 204 and 206 be unavailable due to equipment failure or communication system failure, the network members may seek a secondary network friend to support their operation. In one embodiment, a primary network friend and a secondary network friend are both assigned to each dynamic manifest network.

Figure 4:
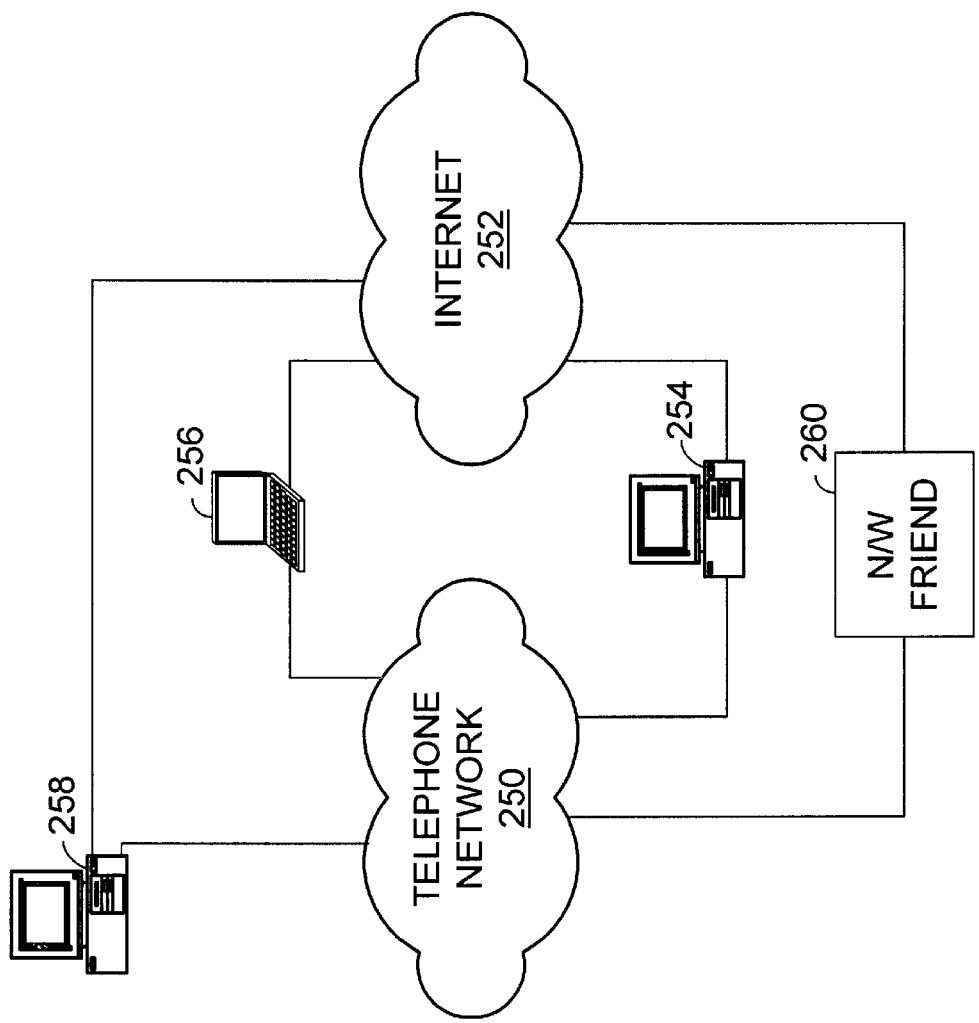
FIG. 4 is still another alternate view of a dynamically configured computer network in which two separate networks (the telephone network and the Internet) are used to facilitate communications among a plurality of respective network members.

FIG. 4 is still another alternate view of a dynamically configured computer network in which two separate networks, a telephone network 250 and the Internet 252 are used to facilitate communications among a plurality of respective network members 254, 256 and 258. A network friend 260 may couple to the Internet (and/or the telephone network 250) so that it may communicate with the network members 254, 256 and 258. According to the present invention, the dynamic manifest network may be instantiated on the telephone network 250 and/or the Internet 252 at any time, such instantiation based upon the particular communication requirements.

As is evident, the telephone network 250 and the Internet each have their own strengths and weaknesses with respect to their support of communications. For example, the Internet has significant security issues, but the PSTN has an acceptable level of security for commercial use and also has the benefits of low latency and fixed bandwidth. On the other hand the Internet tends to be much less expensive than the PSTN for the long distance transfer of data. According to the present invention, the dynamic manifest networks are instantiated to enable a user at the application layer to leverage the advantages of many different lower level protocols and networks while hiding the disadvantages. Various networks and protocols may be used individually at various times, or sequential combination during a given communication session, in tandem, or in a mix of these various approaches.

The ability to transparently use two or more communication networks in a hybrid fashion has many security advantages. For example, if the user desires to communicate data on one network, he/she may send the token via another network (e.g., a token is sent over the telephone network 250 while the data is sent over the Internet 252). This operation reduces the probability that a sniffer will be privy to both the data and the token transaction. In this manner, the total cost of the transaction is reduced by sending only the token over the telephone network 250 while security is maintained. Another technique for increasing security is to partition the original data into multiple pieces that are unintelligible on their own, then to send the multiple pieces over separate networks and/or at separate times, i.e. via multiple separate network sessions. When the data is re-assembled by the multiple network receiver, the original information may be recovered. This technique is called a "partitioning scheme."

There are many possible partitioning schemes. For example, the data may be sent in an arbitrary order on one network session, with the order information sent in another session. A list of bits with no order information is unintelligible, as is a sequence of time stamps without data, hence a sniffer on either session would be at a loss to make sense out of a message without the information from the other session. As is apparent, this method can be applied recursively, with the order information being viewed as data, and thus an arbitrary number of network sessions may be used. Also the method may be applied to blocks of bits instead of individual bits.

In another partitioning scheme, two uncorrelated or nearly uncorrelated messages are mixed in two or more ways such that each mix is unintelligible on its own, or very difficult to understand, while some combination of the mixes may be used to recover recovered the original information. For example, if two data sets, A and B are to be transmitted, one network session may view the bits as a number and send the combination A−B on one session, and then the combination A+B in another session. Only the those who possessed both session results would be able to recover the originals, $2A=(A+B)+(A-B)$, and $2B=(A+B)-(A-B)$. As is evident, many summation operations may be defined in the mathematical field of Group Theory that could be used with the partitioning scheme. This method is expandable to the case of N data sets and N network sessions to further increase security. A similar partitioning scheme may be derived from separating the correlated and uncorrelated data from separate data sets.

Yet other partitioning schemes may be based on Hamming codes. In the Hamming code approach, each block of data, or the data as a whole, is viewed as a vector in a multidimensional space, with each axis in the space having a binary value. The data may be over-determined by using more dimensions than is otherwise necessary. In the over-determined case, if any one or more axes are missing—up to the point where the space is no longer over-determined, errors can be detected, and corrected if choosing the closest legal point in the hamming space is not ambiguous. Hence, one partitioning scheme is based on the principle of sending individual dimensional information in separate network sessions. In its most fundamental form the scheme states that the first bit from each byte is sent in one session, the second bit from each byte is sent in the next session, and so fourth until all bits are sent. In a blocked block variation, the first n bits of each byte (or data block) are sent in the first session, and then the next n bits of each byte sent in the next session, etc. Bandwidth cost and/or performance tradeoffs may be made by sending n0 bits in the first session, n1 bits in the second, and so forth. The more expensive or slower channels have smaller values for n.

In any case, a sniffer applied to any one or more channels would not have access to other bits in each byte. The number of channels the sniffer requires depends on the parameters chosen for the blocking and coding. If redundant coding is applied, then the receiver may recover the original information even if it doesn't receive all the bits. Hence this scheme is oblivious both to limited scope listeners and to attackers who would block transmission. Hamming principles may be applied to any data set even before other partitioning methods are used in order to instill this property of operation with missing bits in concert with other partitioning methods.

Yet other partitioning schemes may be based on hashing table methods, where the structural and data components are sent separately or otherwise mixed. Yet other partitioning methods may be based on compression algorithms, where the decompress header information is sent separately from the data or otherwise mixed. Still other partitioning methods are based on special codes such as gray codes or Huffman codes, where the information describing the structure of the code is sent separate from the data encoded with the code. As is evident, there is no reason to limit partitions to two network sessions, as any number may be used. The foregoing methods may be used individually or in concert.

The hybrid networking construction illustrated in FIG. 4 also has the advantage of more efficiently communicating mixed message content types. In such case, computer message objects may be sent on a packet switched network (Internet 252), and interactive objects may be sent on a circuit switched network (Telephone Network 250).

The present invention also enables the user to define private networks and then to transfer structured multimedia messages between senders and receivers on these private networks. Depending upon its intended scope of use, each of these private networks is defined so that it is instantiated on a differing communication network or combination of computer networks.

For example, a particular user may decide to define three networks, the first network called "management", the second network called "vendors", and the third network called "resellers." In this example, the management network would be private to those people defined to be managers, the vendors network would be private to those defined as vendors, and the resellers network would be private to those defined as resellers. When a multimedia message arrived from a person to be defined to be a manager, the message will be marked as a manager call. Analogously, if a message arrives from a vendor or reseller it will be marked as such. If a call arrives from others, it will be rejected. Alternatively the user may define a public network which accepts messages that would otherwise be rejected. If the message is meant to be interactive, i.e. requiring the real time participation of one or more parties including the user currently being contacted, then the user is notified as such immediately. If the message is non-interactive, the arrival event is marked in a queue of such events. In either case, the message may optionally be recorded in a database of items on the private network. An interactive message request may be switched to a parceled message request by the sender at any time. It should be clear to the reader that this method of defining private networks allows an individual to maintain data in a more organized fashion, and thus effects the higher layers of the network protocol. In addition, this method reduces the exposure of the machine to those defined on the networks—a significant security advantage.

Structured multimedia material consists of recognizable multimedia objects placed in any number or proportion of mix and in various orders; however, certain hardware or certain networks may place limitations on such material, for example limited length or limited type of content. Example multimedia objects are sound, live sound, still pictures, moving pictures with our without accompanying sound (interactive or parceled), formatted or unformatted text, EDI forms, or raw data. Multimedia transfers may be immediate or delayed. They may be sent as a bundle, or composed interactively, or these two processes may be mixed. Those skilled in the art will recognize still more items fall into the category of multimedia objects. Such objects may be viewed directly by the user, stored, or exported and otherwise processed.

The current invention sorts messages into private networks based on an automatic and secure sender identification scheme. That is to say, this scheme is built into the invention and is not left to the sender to define arbitrarily at any time. An exception to this rule occurs when the private network has been specially marked by the user to accept anonymous messages. One secure sender identification scheme is to automatically view the caller ID information or other header or control information provided by the network—and then to correlate this information to a local listing of private network participants. It should be apparent to the reader that a secure sender identification scheme improves security of communications by not allowing non-public network members to be anonymous. This feature also facilitates billing for e-commerce applications.

Many potential uses exist for the structure of FIG. 4. For example, the network friend 260 could be setup by a service provider to enable and service secure communications between two computers. In such case, a computer user coupled to computer 258, for example, desires to transmit a sensitive electronic document to computer 254 and desires to use the tightest of security measures. This electronic document of course could not be emailed across the Internet 252 due to its inherent security shortcomings. Thus, the user of computer 258 contacts the network friend 260 via the Internet 252 at a web site supported by the service provider. The web site allows the computer user of computer 258 to setup and to pay for the particular transaction. Alternatively, the web site could allow the computer user to subscribed to a continuing service that would facilitate the electronic document transfer, as well as other transfers.

Client software is then downloaded from the web site to the computer 258 to facilitate the electronic document transfer. If a copy of the client software has already been downloaded to the computer 258, this step is not required. The user then sets up the transaction using the client software by interacting with the network friend 260 via the web site. The client software will also include components that facilitate the later transfer of the electronic document from the computer 258 to the computer 254. In setting up the transaction, the user identifies itself (e.g., phone number, password, electronic document id, etc.) and also identifies computer 254 in a same or similar manner. The user of computer 258 is able to select different attributes for the transaction. In the present example, because the electronic document is of utmost importance, the user of computer 258 elects to have the transfer of the electronic document encrypted/decrypted and to be transmitted across the telephone network 250.

Based upon the interaction with the user of computer 258, the network friend 260 creates a metanetwork that will be employed to facilitate the electronic document transfer. In establishing the metanetwork, the network friend 260 establishes communication rules that will be employed to establish a link between computer 258 and computer 254 and to transport the electronic document between the computers 254 and 258. This metanetwork includes tokens (and/or other encryption information) that will be later used for computer 254 to authenticate computer 258, for computer 258 to authenticate computer 254, and for the electronic data to be encrypted/decrypted.

After creation of the metanetwork, the network friend 260 creates a local view of the metanetwork for computer 258 and provides the local view to computer 258. In one operation, this local view is provided to the computer 258 via the Internet 252. However, in another even more secure operation, the local view is provided to the computer 258 via the telephone network in a subsequent communication. In such operation, the network friend 260 establishes a metanetwork of which it is a member and the computer 258 is a member. The network friend 260 then establishes a link to the computer 258 via the telephone network 250. Via this link, the network friend 260 provides the local view of the metanetwork, of which computer 258 and computer 254 are members, to computer 258.

The network friend 260 also creates a local view of the metanetwork that will facilitate the electronic document transfer between computer 254 and computer 258. Once this local view is created, the network friend 260 contacts computer 254 via email, a direct call or in another fashion. Alternatively, the network friend 260 could initiate a communication to the user of computer 254, requesting that the user take steps to receive the local view. Acting on this information, the user of computer 254 initiates a connection to the network friend 260. In the present example, this connection could be either via the Internet 252 or via the telephone network 250. Once the connection is established, client software (if required) and the local view are downloaded from the network friend 260 to the computer 254. With the local views now in place at both computer 258 and computer 254, a dynamic manifest network is established through which the electronic document is transferred from the computer 258 to the computer 254. By using the telephone network and encrypting/decrypting the electronic document, the transfer is extremely secure.

Figure 5:
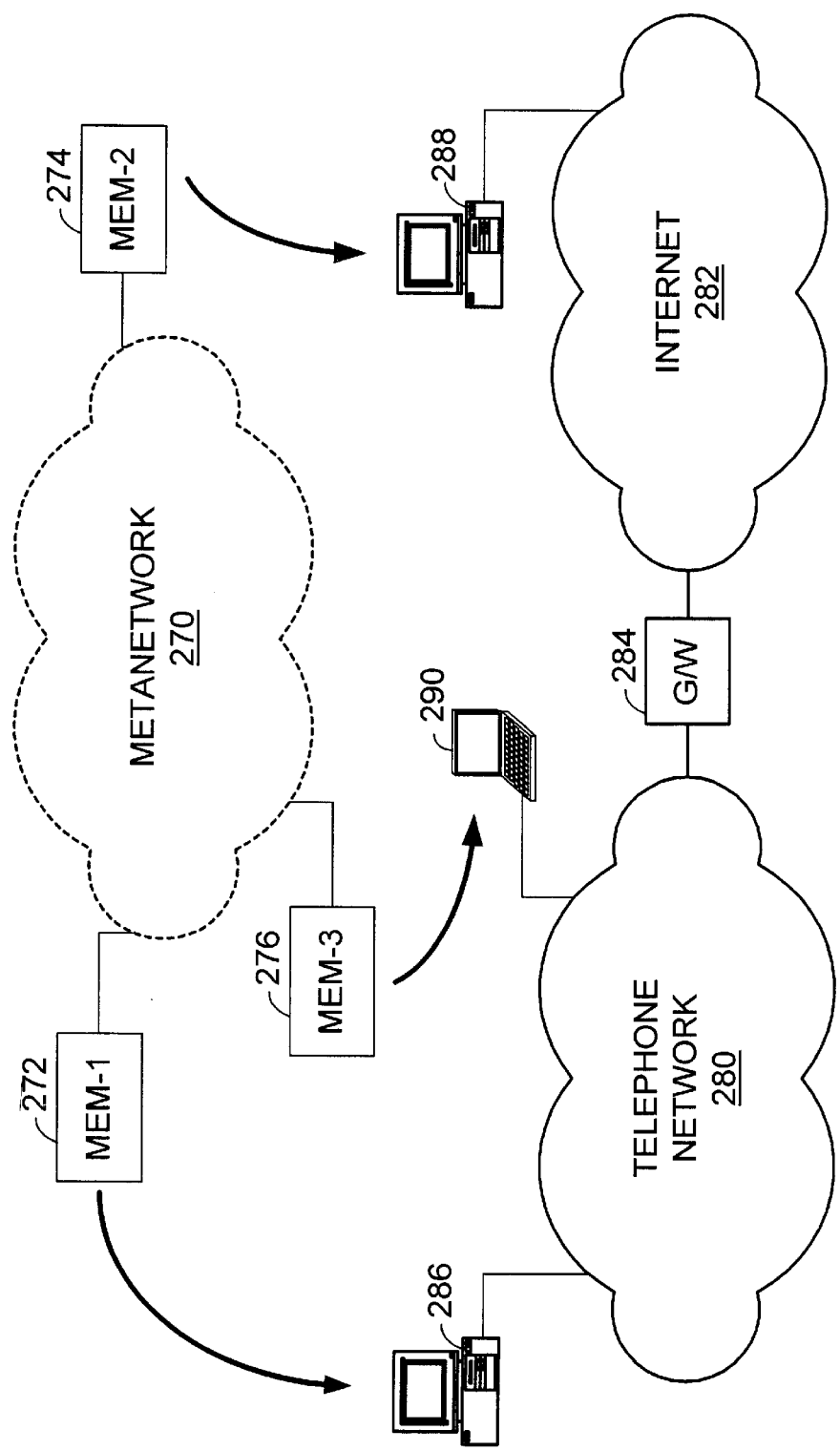
FIG. 5 is a block diagram illustrating the relationship between a metanetwork which represents a network having a plurality of network members and a dynamic manifest network that operates according to the metanetwork representation.

FIG. 5 is a block diagram illustrating the relationship between a metanetwork which represents a network having a plurality of network members and a dynamic manifest network that operates according to the metanetwork representation. A metanetwork 270 is defined such that it includes three network members, MEM-1 272, MEM-2 274 and MEM-3 276. Each of these network members 272, 274 and 276 possesses its own local view of the metanetwork.

The metanetwork is instantiated via computers 286, 290 and 288 such that computer 286 instantiates MEM-1 272, computer 288 instantiates MEM-2 274 and computer 290 instantiates MEM-3 276. As is shown, computers 286 and 290 couple to the telephone network 280 while computer 288 couples to the Internet 282. Further, as is shown, gateway 284 is in place between the telephone network 280 and the Internet 282 to service communicates within the network. Thus, communications between computer 286 (MEM-1) and computer 290 (MEM-3) may be accomplished by the telephone network 280 alone. However, communications between computer 288 (MEM-2) and computer 286 (MEM-1) or computer 290 (MEM-3) must pass between the telephone network 280 and the Internet 282 via the gateway 284.

Because the Internet 282 is inherently less secure than the telephone network 280, it is desirable that all dynamic manifest networks employ the telephone network 280 (or another network having satisfactory inherent security). Thus, when communications serviced by the dynamic manifest network have satisfactory security for most "secure" transactions. Of course, encryption techniques may also be applied to increase the security of the dynamic manifest network.

Figure 6:
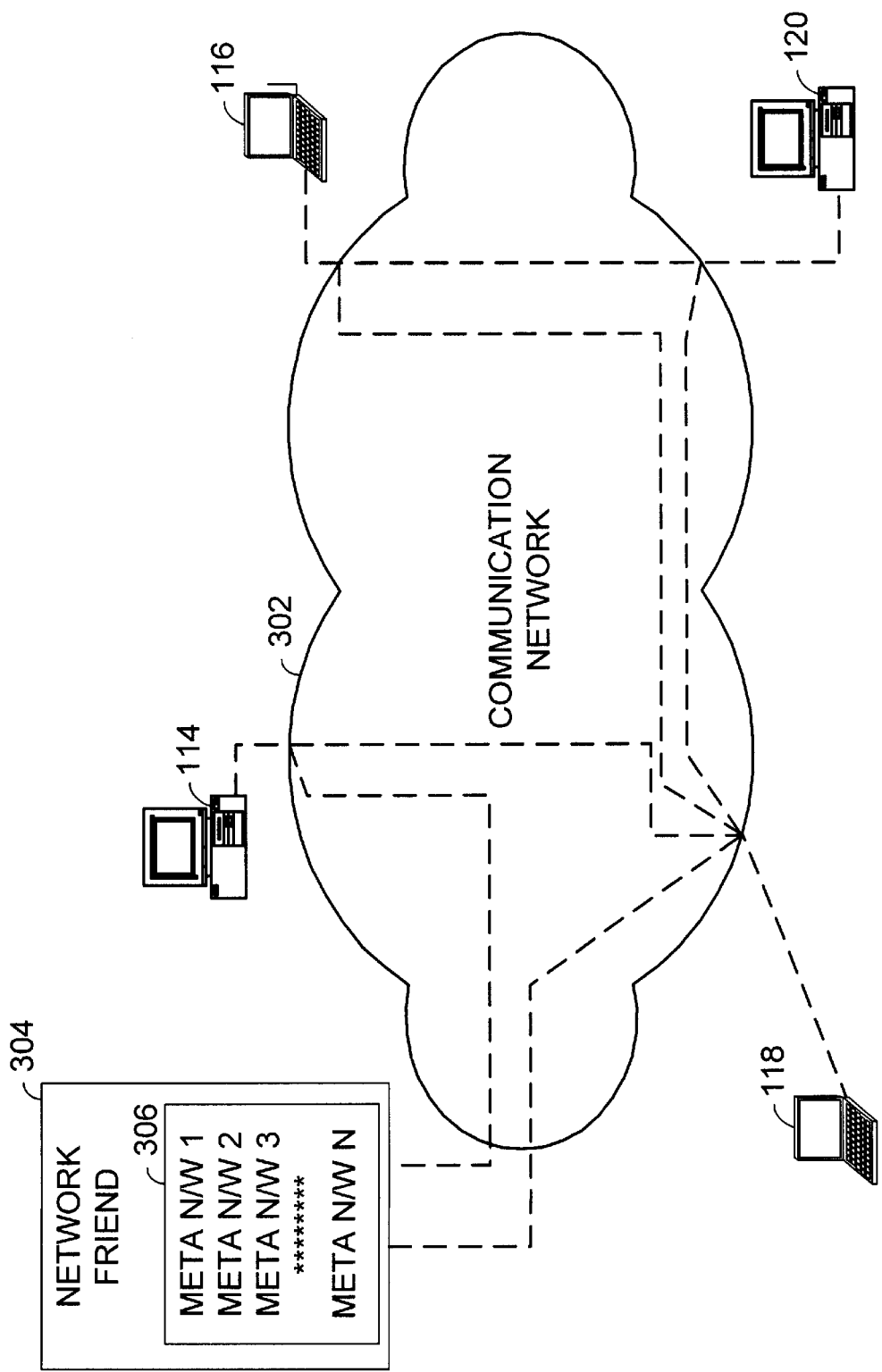
FIG. 6 is a partial view of the dynamically configured computer network of FIG. 1 illustrating the locations of potential link formations between network members of a particular dynamic manifest network.

FIG. 6 is a partial view of the dynamically configured computer network of FIG. 1 illustrating links between network members of the computer network. The network members 114, 116, 118 and 120 illustrated correspond to the dynamic manifest network 106 of FIG. 1. As the network members 114–120 join the dynamic manifest network 106, they call the network friend 304 in order to register. Upon receiving a registration request, the network friend 304 performs a configuration update and either creates or modifies a metanetwork configuration 306 for the dynamic manifest network 106, depending on whether a metanetwork has been previously created. Upon receipt of a request to create a network configuration for network members 114–120, a system administrator initializes the metanetwork configuration 306 for the network members 114–120 or the metanetwork configuration 306 is created by other means as discussed elsewhere herein. The network members 114–120 then either receive a local view of the metanetwork via a hard copy (such as a CD ROM) or call the network friend 304 to receive the local view of the metanetwork. After receipt of the local view of the metanetwork by the network members, full or partial communications among the network members are enabled.

A portion of the possible network links between the network members are shown in FIG. 6. For example, in an initial operation, network member 114 calls the network friend 304 and downloads the local view of the metanetwork configuration 306 for the dynamic manifest network. Then, the network member 114 may communicate directly with network member 118 via the link indicated by the dotted line. During subsequent operations, the network member 114 may call the network friend to receive updates. As is also shown, network members 116 and 118 may communicate directly with network member 120 via the links indicated. Thus, as compared to prior structures, the network members 114–120 connect directly to other network members via a communication network 302 (or multiple communication networks).

Figure 7:
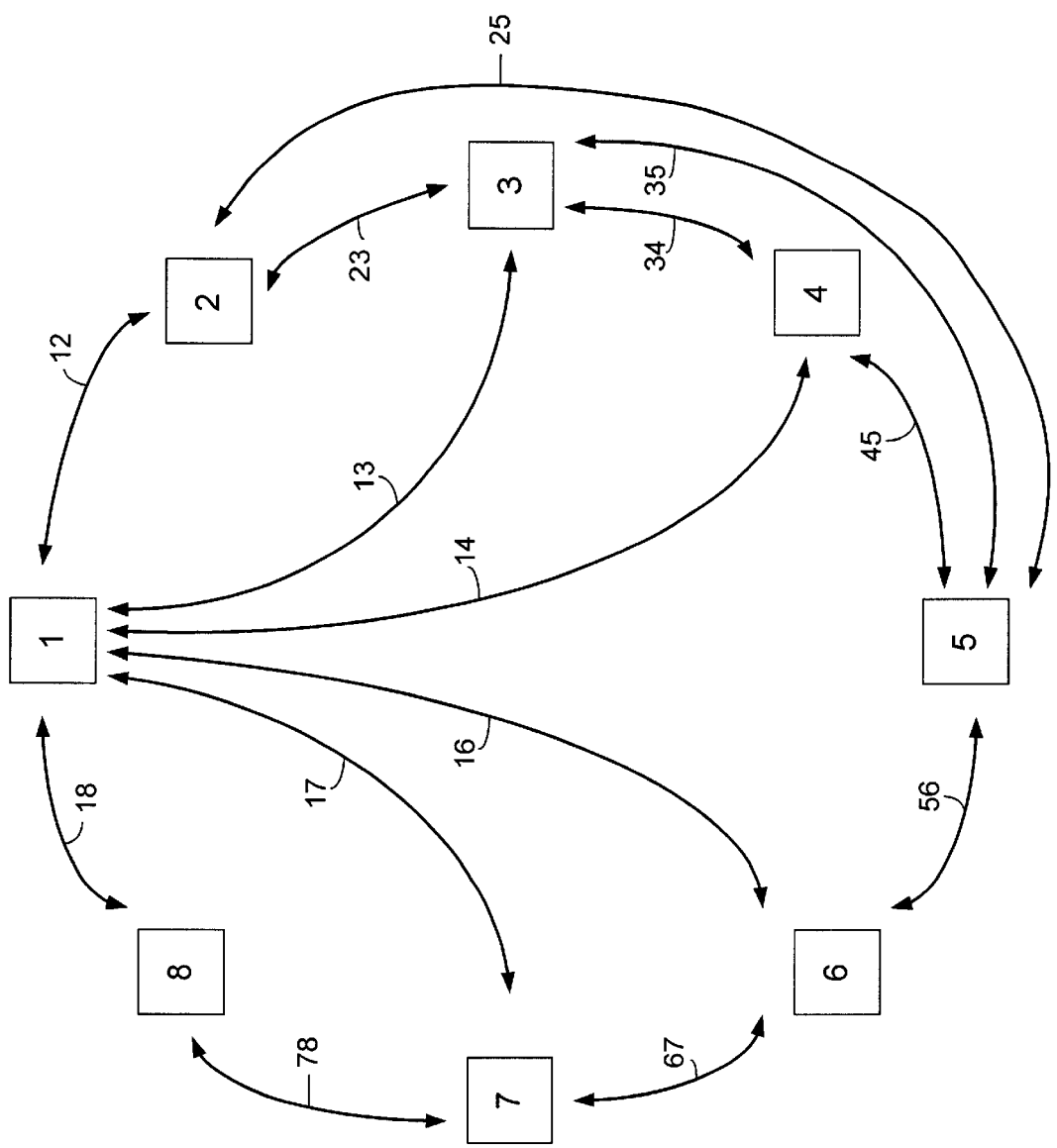
FIG. 7 is a diagram illustrating the manner in which connections between members of a dynamic manifest network are accomplished over time.

FIG. 7 is a diagram illustrating the manner in which links between members of a dynamic manifest network are accomplished over time. Eight network members, 1 through 8 are illustrated. However, the number of network members in other dynamic manifest networks may include different numbers of members. According to one operation of the present invention, communications between network members are established on an as needed basis via a telephone network, in many cases a circuit switched network. Each connection is established between a calling network member and a called network member. However, between any two network members, either member could be the calling network member, depending upon which member initiated the call. Some of the dynamic links of the dynamic manifest network are illustrated, with the numbering convention illustrated indicating a first network member and a second network member. For example, a call between network member 1 and network member 2 is illustrated as link 12. Likewise, for example, a call between network member 4 and network member 5 is illustrated as link 45.

In an alternate operation, communications are accomplished via the Internet or another packet switched network. As compared to the links established in a telephone network, these links may be called "pseudo links" because no direct channel is established between network members. However, in establishing the pseudo links, analogous techniques are employed to ensure that only two intended network members communicate over the pseudo link. In one embodiment, a tunnel is setup for each link established and released when the link is complete.

Referring again to the telephone network example, communications between any two network members are transported along a unique link via the telephone network. Further, as is appreciated, the number of connections each network member can make to other network members (or the network friend) is limited by the number of ports installed on the network member. For example, when a network member communicates via two ISDN B channels, the network member may service two calls simultaneously.

These calls could be both initiated by the network member, both received by the network member or one of each. Further, in the two port ISDN example, the network member could communicate with a network member and the network friend at a same time. When the ISDN service provided for the network member includes two data channels and a voice/control channel, the network member may also place and receive voice calls while connected to two other network members via two links.

According to the present invention, the links between network members are dynamically configured and established to service particular communication requirements. When no communication is required between two network members or between a network member and the network friend, no link is established. Thus, usage of the telephone network is minimized (along with the cost of such usage).

When communications among the network members are orchestrated, each link, e.g., 12, 13, 14, ..., 78, is allocated a particular time segment according to suggestion rules to avoid collisions with other links vying for the same resource (port to receive a call). By performing such orchestration in time, call collisions are minimized. Thus, the calls are connected, the communications passed between network members (and between the network member and the network friend) and resources of the network members are conserved for other of their functions.

Orchestration in time increases network efficiency, increases the probability of services being available and increases the strength of authentication. Orchestration is implemented by managing links among network members. The basic problem being optimized by orchestration is the assignment of potential link formations in the metanetwork, such potential link formations transferred in operation to the dynamic manifest network. The number of links that may simultaneously terminate at any particular node on the network is limited. For example, on the PSTN the standard interface for ISDN allows for two simultaneous B channel connections—however, both B channels may be used in the implementation of a single link. Hence, for such a node using ISDN, either one or two links may terminate at the node depending on the bandwidth requirements of the links.

The most fundamental orchestration scheme is based on schedules or calendars of time windows. A time window is a fixed period of time that occurs as measured by a global time keeper—and as measured by synchronized clocks accessed by the network nodes. A time window is said to have duration t. In the simplest case, each node allows exclusively one link at any time. Suppose that n nodes (network members) are involved. It follows that there are (n (n−1))/2 possible point to point links (or pseudo links). These links may be virtualized via the use of another underlying network which has its own set of constraints. According to Equation (1), the number of time windows needed for orchestration of these n nodes is:

$$N = \text{ceiling}\left(\frac{n(n-1)}{2 \text{ floor}(n/2)}\right) \quad \text{Equation (1)}$$

This formula follows from the number of links needed in total, divided by two since each link may be used for sending and receiving in this example, and divided by the number of links that may be supported simultaneously on the network. The total time required over which all orchestrated links are serviced is set out in Equation (2) as:

$$T = Nt \quad \text{Equation (2)}$$

where t is the duration of each link.

The problem is now reduced to one of making the partner node assignments on each node such that links mutually line up between all users on the various nodes, i.e. that the time window for A calling B is the same as the time window of B calling A, for arbitrary A and B. One technique for assigning such partner nodes proceeds as follows. Each user creates an ordered list of the n nodes in the private network. Say the function that creates this ordering is called 'O'. O operates on the private network definition, which in turn is a set of nodes. Any function definition which creates a unique ordering across the various nodes of the network may be used. For example, we have used the unique user id's given when the network is created. As an alternative, if user names were unique, they could be sorted into a list. It is common to require members of a network to have unique user names (addresses). Another alternative is to use the exact time which the machine entered the network—if that is unique. Another alternative is for a maintenance supervisor, committee, or network group to publish a de facto list to the network. The function O may be pre-arranged and shipped with the invention. Another method is for the network members to determine the function O. Independent of how the list is decided upon, for purposes of illustration here, we will generalize and say that the resulting list appears as: {user[1], user[2], user[3], ... }.

Figure 8A:
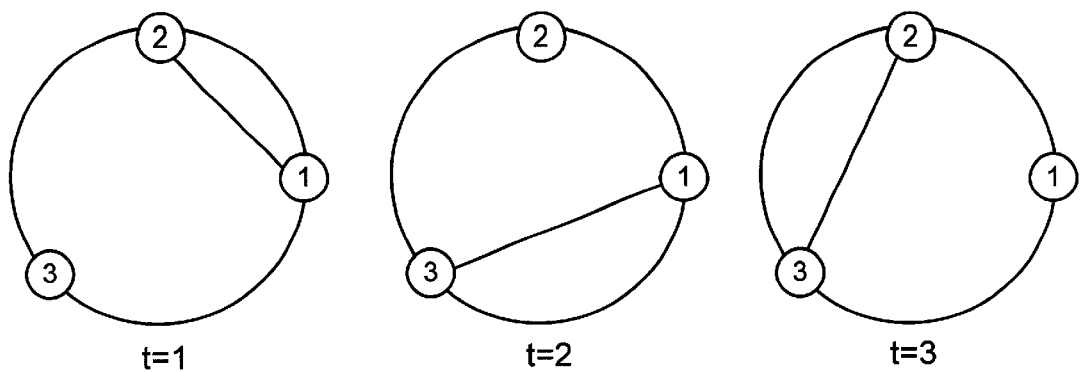
FIGS. 8A, 8B and 8C are diagrams illustrating the manner in which links and/or pseudo links are established in a dynamic manifest network over time to facilitate communications between network members.

FIG. 8A shows a three node orchestrated metanetwork during three separate time periods. The links in the graphs represent links which may be potentially formed under the rules of orchestration. The dotted circles are simply used as a visual aid for the reader by giving some notion of body to the network time slice. We have arbitrarily ordered the configurations to cause node one to connect in consecutive order to the other nodes, those skilled in the art will recognize that other orders and permutations are equivalent. It can be seen in the diagram that the rotation interval T is broken into three parts t=1, t=2, and t=3. Each one of these is a time window where a link may be formed between two nodes. The rotation interval is repeated to provide a continued orchestration. It would be possible to change the order of the configurations used in each repeated rotation interval, if this were advantageous, perhaps for security reasons, otherwise the pattern may be repeated in sequence. In this example, that is to say, in the first time window, node 1 may link to node 2, in the second window node 2 may link to node 3, and in the third, node 1 may link with node 3; after this we go back to node one linking with node 2, and so fourth.

Figure 8B:
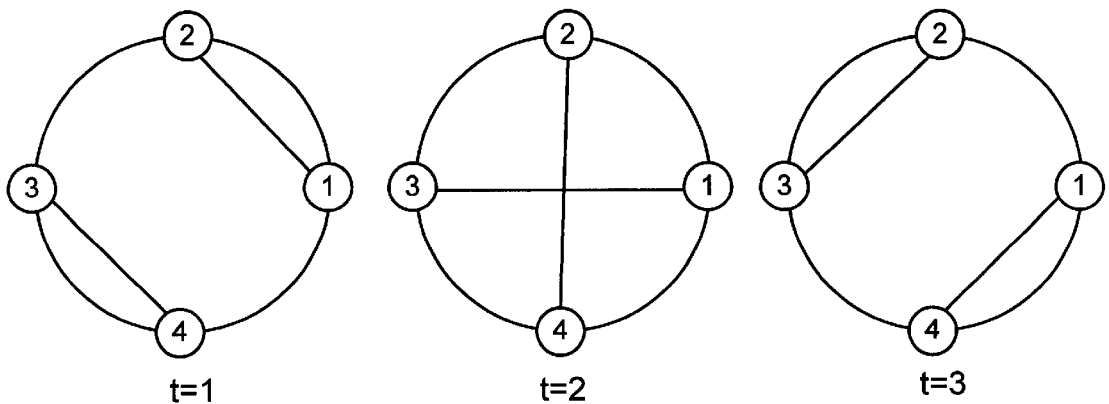

FIG. 8B illustrates the principles of orchestration as applied to a four node case. In the four node case, the metanetwork may have two simultaneous links, so the rotation interval still requires only three time windows. As is shown, during time interval t=1, node pair 1 and 2 communicate as do node pair 3 and 4. Further, during time interval t=2, node pair 1 and three and node pair 2 and 4 communicate. Finally, during time interval t=3, node pair 1 and 4 and node pair 2 and 3 communicate. Thus, all communications are orchestrated in three time intervals.

Figure 8C:
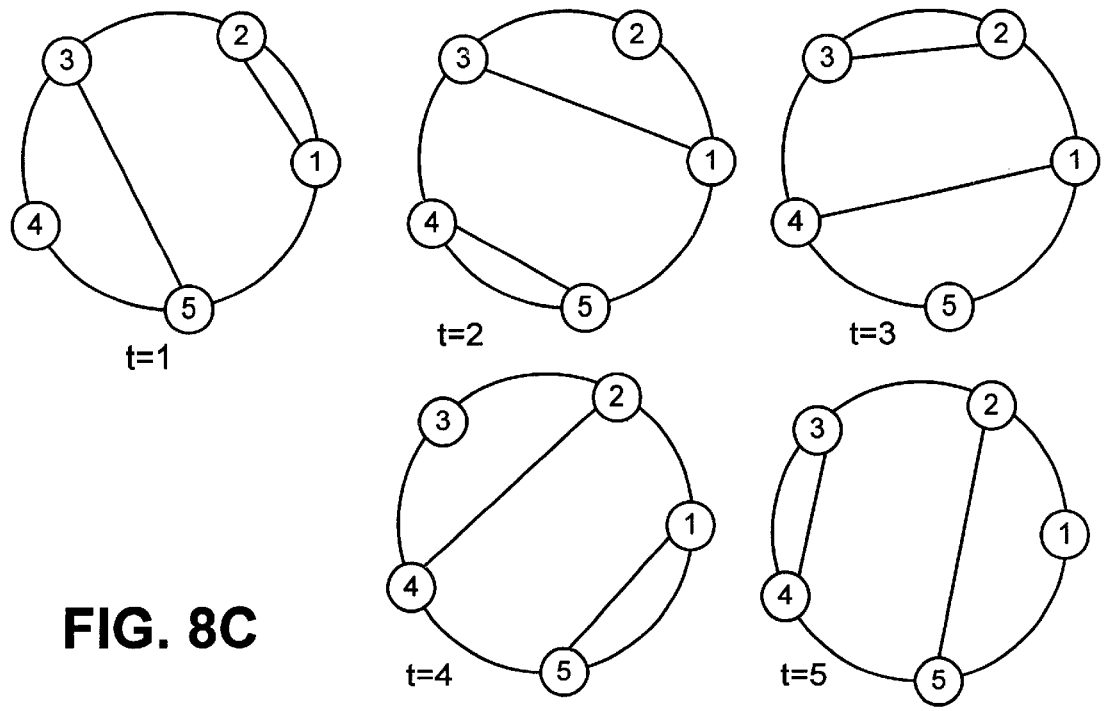

FIG. 8C illustrates a five node network that requires five time periods within which to orchestrate communications among the network members. As shown, during time period t=1, node pair 1 and 2 and node pair 3 and 5 communicate. During time period t=2, node pair 1 and 3 and node pair 4 and 5 communicate. Further, during time period t=3, node pair 1 and 4 and node pair 2 and 3 communicate. Moreover, during time period t=4, node pair 1 and 5 and node pair 2 and 4 communicate. Finally, during time period t=5, node pair 2 and 5 and node pair 3 and 4 communicate. Thus, in these five time periods, complete orchestration for the five node group is accomplished.

A number of conventional network connection matrices may be placed in a set in order to represent the metanetwork. For example in the three node case Equation (3) represents the dynamic link formation for the three time periods as:

$$\left\{ \begin{bmatrix} 1 & 1 & 0 \\ 1 & 1 & 0 \\ 0 & 0 & 1 \end{bmatrix}, \begin{bmatrix} 1 & 0 & 1 \\ 0 & 1 & 0 \\ 1 & 0 & 0 \end{bmatrix}, \begin{bmatrix} 1 & 0 & 0 \\ 0 & 1 & 1 \\ 0 & 1 & 1 \end{bmatrix} \right\} \quad \text{Equation (3)}$$

A composite matrix may then be produced by summing individual matrices in the set in an orthogonal series expansion, or in any other expansion that will not perturb the time evolving potential connection information. For example, the function $2^t$ may be used to create such a composite matrix set as shown in Equation (4) as:

$$\begin{bmatrix} 7 & 1 & 2 \\ 1 & 7 & 4 \\ 2 & 4 & 7 \end{bmatrix} = 2^0 \begin{bmatrix} 1 & 1 & 0 \\ 1 & 1 & 0 \\ 0 & 0 & 1 \end{bmatrix} + 2^1 \begin{bmatrix} 1 & 0 & 1 \\ 0 & 1 & 0 \\ 1 & 0 & 0 \end{bmatrix} + 2^2 \begin{bmatrix} 1 & 0 & 0 \\ 0 & 1 & 1 \\ 0 & 1 & 1 \end{bmatrix} \quad \text{Equation (4)}$$

Such composite matrices for the 4 and 5 node cases are as shown respectively in Equation (5) and Equation (6) as:

$$\begin{bmatrix} 7 & 1 & 2 & 4 \\ 1 & 7 & 4 & 2 \\ 2 & 4 & 7 & 1 \\ 4 & 2 & 1 & 7 \end{bmatrix} \quad \text{Equation (5)}$$

$$\begin{bmatrix} 31 & 1 & 2 & 4 & 8 \\ 1 & 31 & 4 & 8 & 16 \\ 2 & 4 & 31 & 16 & 1 \\ 4 & 8 & 16 & 31 & 2 \\ 8 & 16 & 1 & 2 & 31 \end{bmatrix} \quad \text{Equation (6)}$$

As is apparent, a regular pattern occurs in these matrices that may be extended to create metanetworks with arbitrary numbers of network nodes.

In many networks it will be up to one of the nodes to initiate a link. The decision of who should initiate a link can be based on any of a number of deciders, for example, the node higher in the list of nodes returned by O may be used. As another example, rotation groups, as above, may be defined for link formation. In which case the metanetwork has directed arcs. As another example, the decision may be made arbitrarily. The decision may be made based on outside criteria such as toll rates, or the ability of a user to pay. Independent of the approach used to decide which node should attempt to initiate a link, it may be the case that the node will only initiate the link if the node has data to send, or it is compelled to check the other node for data to be received. In at least one embodiment, in the case that the assigned initiating node does not initiate the link, the node at the far end of the link may initiate. For example, if according to the metanet, node A were assigned to initiate a link to node B and it was the proper time to initiate that link, node A may not actually create the link, node A may not detect that any communication needs to be done. After a short period of time, node B may realize that node A did not initiate the link formation. If node B is compelled, it may then initiate the link. Other initiating schemes are possible. For example, if either party has a communication need, they may form the link. If a collision occurs, one party may be said to dominate, and thus the other will not retry (multi-level orchestration). In another initiation scheme, a random backoff and retry may be used.

In the case that all nodes on the network support more than one network interface simultaneously, the network may be seen as a composite of the network interfaces. The components of the composite may be synchronized in order to allow increased bandwidth over multiple links simultaneously. Alternatively, the components may be left unsynchronized so that the composite rotation interval is shorter.

After a certain period of time, and if this feature is enabled, a third node may check to see if the network interface is busy on A or B, if it has a communication need with A or B. If the interface is not busy, then this third node may create a link. Hence three sub intervals may be defined within any time window: (1) opportunity for assigned link formation, (2) opportunity for reciprocal link formation, and (3) opportunity for third party link formation. Third party link formation may also be orchestrated so as to increase the probability that that third party intervention occurs without collision when a link is indeed left unused. This method leads to an average rotation interval that may be much shorter than the deterministic rotation interval. In the case that communication load is not balanced such that some nodes communicate together more often than others, a small time window may be defined, and multiple time windows may be assigned to the same two nodes for link formation during one rotation interval.

Orchestration also serves to strengthen authentication functions. Nodes that do not comminute at the correct time are considered to be non-authentic. As a further technique to strengthen authentication, orchestration may use authentication token information to determine the orchestration pattern, thus causing orchestration to be a function of time. Thus, the times at which the nodes connect with one another vary over time.

For example, in the three member network, if node 1 needed to communicate with node 2 twice as often as node 3 needs to communicate with nodes 1 or 2, then two time windows are assigned to the link formation between node 1 and node 2 within each rotation interval. In the case that multiple time windows are defined for a given link formation, these windows may be placed adjacently so that the number of times that a link must be formed can be reduced. Alternatively the multiple time windows may be purposely spread out to reduce the orchestrated time delay necessary in order to synchronize the network. A mixed scheme may be used. In the limit as the time window size goes to zero, the multiple assignment scheme leads to continuous valued time windows. Network balance may be a function of time. For example nodes A and B may have a heavy communications load during certain time of the day or certain times of the year. Thus orchestration of time windows may be time dependent. Experience may be used to determine when good calls times are, and this may be integrated with the orchestration in order to create smoother link formation.

Figure 9:
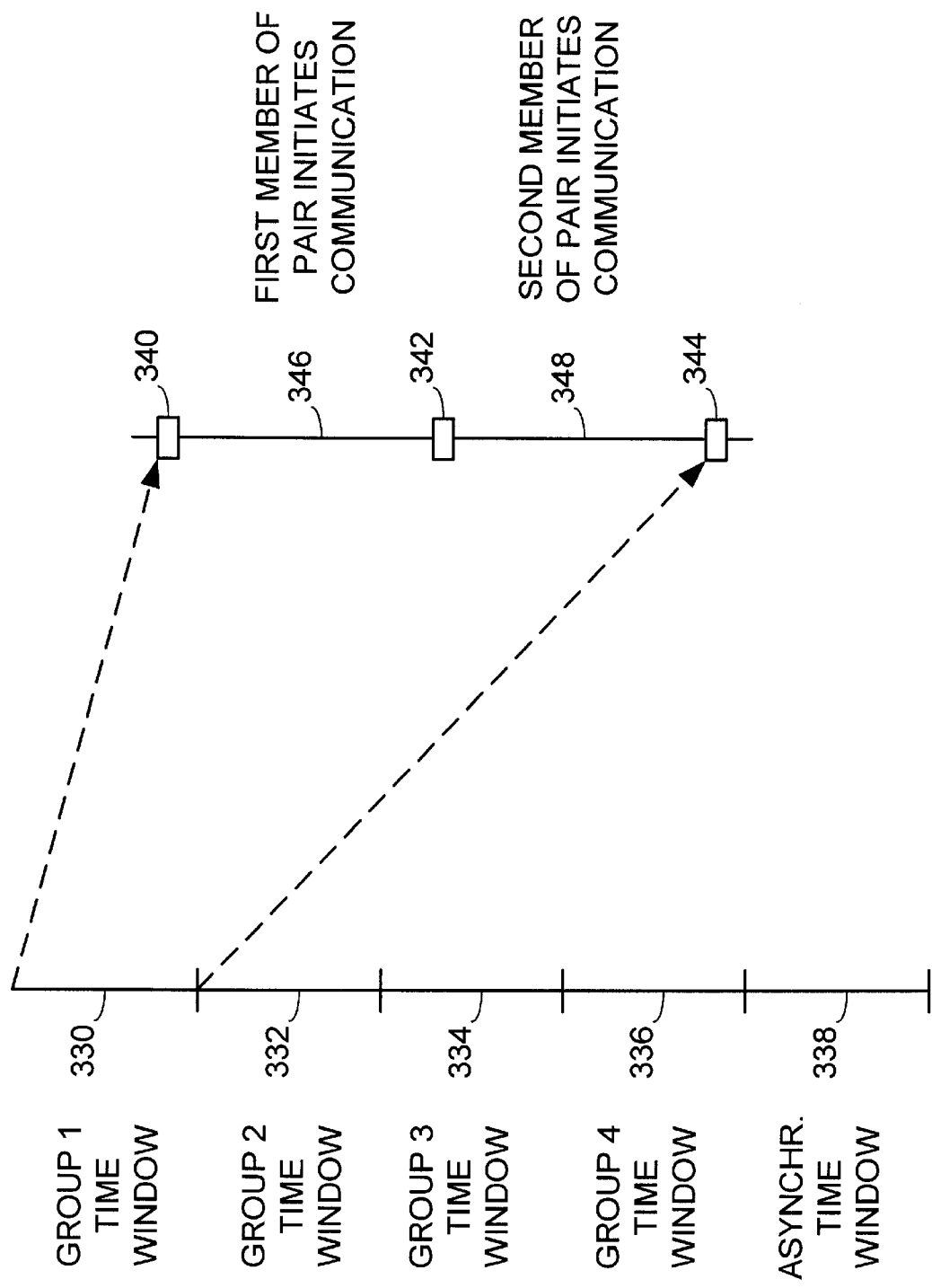
FIG. 9 is a diagram illustrating the construction of time windows in which links are orchestrated according to the present invention.

FIG. 9 is a diagram illustrating the construction of time windows in which links are orchestrated according to the present invention. As shown, in the present example, five separate time windows exist in a rotation group for the local view of network member A, for example. In a Group 1 time window 330 network member A may attempt to communicate with other members of Group 1 and/or other members of Group 1 may attempt to communicate with network member A. In a Group 2 time window 332, network member A may attempt to communicate with other members of Group 2 and/or other members of Group 2 may attempt to communicate with network member A. A Group 3 time window 334 and a Group 4 time window 336 follow Group 2 time window 332 and facilitate communications between network member A and the members of the particular group. An asynchronous time window 338 is available for communications between any network members.

Each time window established may be further broken into sub-windows. For example, Group 1 time window may be subdivided into two sub-windows. Guard bands 340 and 342 surround sub-window A in which the network member A may initiate a link or pseudo link with any other member of Group 1. Guard bands 342 and 344 surround sub-window B in which another member of Group 1 initiates communication network member A.

Figure 10:
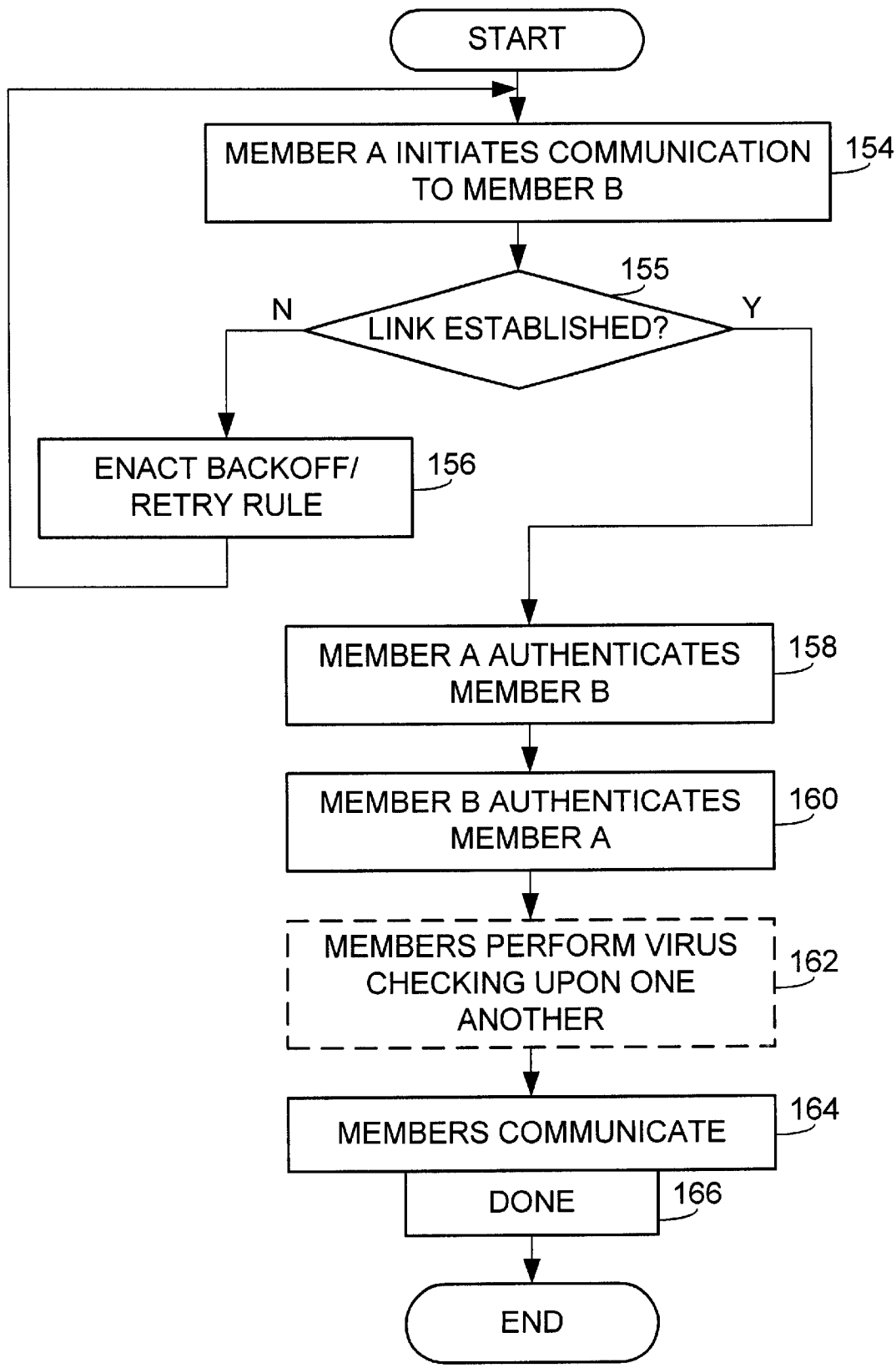
FIG. 10 is a logic diagram illustrating operation according to the present invention in which one network member establishes a link/pseudo link with another network member to facilitate communication.

FIG. 10 is a logic diagram illustrating operation according to the present invention in which one network member establishes a link/pseudo link with another network member to facilitate communication. Operation commences at step 154 where member A initiates communication with member B. If a link is not established, as determined at step 155, operation proceeds to step 156 where a backoff/retry rule is enacted and communication is again initiated at step 154. If the link is established at step 155, operation proceeds to step 158 wherein member A authenticates member B. Then, at step 160, member B authenticates member A. At step 162, the members optionally perform virus checking upon one another. Then, at step 164, the members communicate with one another until their communications are completed at step 166. From step 166, operation ends.

In initially setting up a metanetwork/dynamic manifest network among a group of members, the network friend may provide authentication rules to each network member. In providing a local view of the metanetwork and authentication information, a secure communication channel (or methodology) should be employed. The secure channel may be a telephone network connection that is directly dialed between the network member and the network friend. If a telephone network connection is unavailable, the authentication information may be provided over multiple sessions/channels or may be encrypted using public tokens. The authentication information may be one or more tokens, each having a token identifier and a randomly generated token body. The token may also include a token history, which indicates its time of creation, creator and migration history. This authentication information is retained by the network member for future use in establishing links with other network members. This same technique is used with other network members until all network members have been serviced. At such time, the dynamic manifest network is fully setup.

When the metanetwork/dynamic manifest network is setup by the network members, an initiating network member (primary network member) is the initial point of contact and provides the initial setup functions. The initiating network member determines who may join the network. Thus, the user of the initiating network member must perform some initial setup functions with regard to the other network members. These setup functions will include identifying the phone number(s) of the other network members, authentication techniques to employ in setting up and continuing operation of the network and, in some cases, partially defining the orchestration rules to be employed.

In a particular example, a chief executive officer (CEO) of a company would like to setup a metanetwork/dynamic manifest network for the other officers of the company. The CEO, via his computer, identifies each member of the metanetwork, e.g., the chief operating officer (COO), the chief technology officer (CTO), etc. Identification includes caller IDs for each other member, a login ID and a password.

The CEO then notifies the COO and the CTO that a metanetwork has been defined for the group. Both the COO and the CTO cause their computers to dial the computer of the CEO (at separate times). Upon a connection, e.g., the COO to the CEO, the CEOs computer authenticates the COO via the login ID and the password. Once the authentication is completed, the CEOs computer generates a local view for the COO and provides it to his or her computer. Authentication information is also provided to the COO's computer for future use in establishing links to the CEO's computer and the CTO's computer. This same process is used enacted for the CTO. Once completed, the dynamic manifest network is fully enabled and functions to facilitate communications among the group.

The tokens passed among the network members are used in authenticating network members during link formation. These tokens may also be used for encrypting/decrypting communications between network members at step 164. Further, during communications among network members, additional tokens may be generated and passed among the network members. These tokens may then be subsequently used in future authentication and encryption operations. Further, these tokens may be migrated from network member to network member and subsequently used to authenticate and encrypt/decrypt links and communications.

Figure 11:
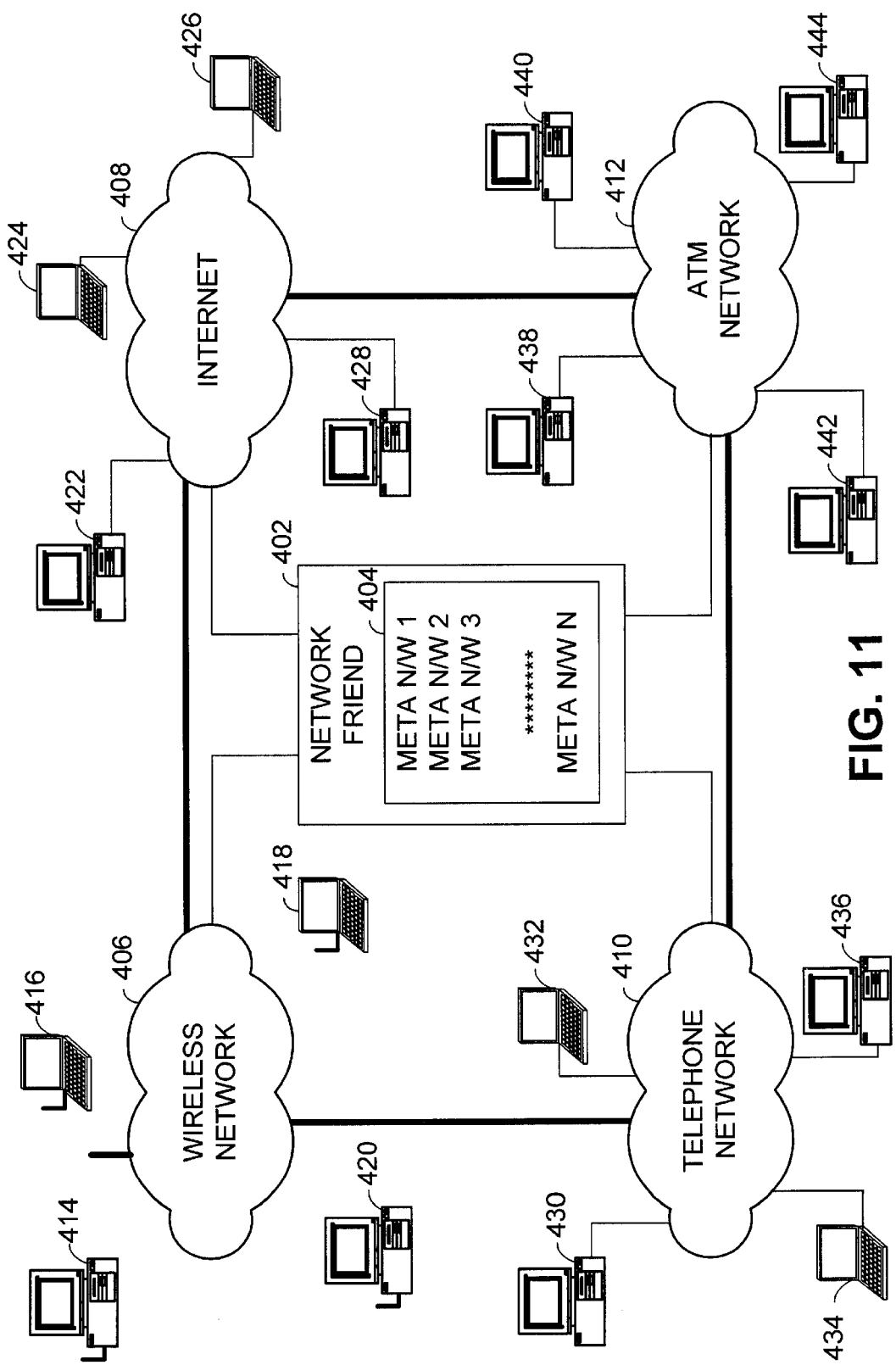
FIG. 11 is a system diagram illustrating an alternate physical configuration of a dynamically configured computer network constructed according to the present invention in which a plurality of separate communication networks are employed to support communications between network members.

FIG. 11 is a system diagram illustrating an alternate physical configuration of a dynamically configured computer network constructed according to the present invention in which a plurality of communication networks are employed to support communications between network members. As is shown, four different communication networks 406, 408, 410 and 412 support communication among a plurality of network members 414–444. Further, as is shown, a network friend 402 couples to each of the telephone networks 406, 408, 410 and 412. The network friend 402 stores a plurality of metanetwork configurations 404 that define a plurality of dynamic manifest networks supported by the telephone networks 406, 408, 410 and 412. The network friend 402 is shown as a single unit for simplicity in description. However, the network friend 402 may be a number of network friends dispersed as required among the telephone networks 406, 408, 410 and 412.

The wireless network 406 supports wireless communications with wireless enabled computers 414, 416, 418 and 420. The other communication networks 408, 410 and 412 support wired communications. However, these communication networks 408, 410 and 412 may be owned and operated by differing service providers. Thus, the network friend 402 supports operation across differing types of communication networks and across communication networks that are provided by differing service providers. In any case, the members of a particular metanetwork may communicate across differing communication network structures.

FIG. 12 is a block diagram illustrating the structure of a plurality of metanetworks 500 supported by a network friend. Each of the metanetworks defines a particular dynamic manifest network. Metanetworks 502, 504 and 506, as well as other metanetworks are stored on the network friend 500 or exist as an abstraction as a collection of local network views. As is shown, a first metanetwork includes nine network members, having network member IDs 1 through 9 (network member information for network members 1, 2, 3 and 9 being shown). Information for each network member includes the telephone number(s) and/or the IP address of each network. The information also includes the peers which may be called by the particular network member. So, for example, network member 1 has a primary telephone number (512) 794-3678 and a secondary telephone number of (512) 767-0098. Other network members having the authority to call network member 1 may attempt to call network member 1 at the primary telephone number first and the secondary telephone number second.

Network member 1 may call network members 2, 3, 4, 7, 8 and 9 of the dynamic manifest network. Thus, as indicated, network member 1 may not call network members 5 and 6 of the dynamic manifest network. While in many dynamic manifest network groups each network member may access each other network member, such is not the case with network member 1 of metanetwork 502. Communication rules include both suggestion rules and backoff rules for each network member. For example, for network member 1, communication rule 2T7B4 indicates that communications from network member 1 to network member 2 are to occur during time segment 7 and adhere to backoff rule 4. Time segment 7 and backoff rule 4 are defined in the operation of dynamic manifest network and specified in general operating rules. In adhering to suggestion rules, it is imperative that the network members have substantially synchronized clocks. ISDN headers typically include time stamps which may be employed to check synchronization between network members. In other embodiments, the network friend could periodically synchronize network member clocks.

FIG. 13 is a block diagram illustrating a local view 600 of a metanetwork as contained on a network member of a dynamic manifest network, the local view employed by the network member to establish communications with other network members of the dynamic manifest network. The local view 600 corresponds to network member 1 of the metanetwork 502 described with reference to FIG. 12. The local view 600 includes communication rules for accessing the network friend (CST7B9). These communication rules suggest to the network member to access the network friend at time interval T7 and to employ backoff rule 9. The network member will typically employ these communication rules so as to equalize loading on the network friend.

Because the network friend may service only a limited number of incoming calls at any point in time, it is desirable to equalize the call loading on the network friend over time. While this is not always feasible, it may be accomplished for various operations. With respect to new network members initially registering with the network friend, specific time slots may be reserved for registration operations. Subsequent to registration, each of the network members accessing the network friend will be assigned a time slot and backoff rule for subsequent calls to the network friend. With network members generally adhering to these communication rules, network friend incoming call resources are substantially equalized.

For each network member "seen" by the subject network member, a PEER ID (network member), respective telephone number(s), IP address(es), a suggestion rule and a backoff rule are provided. For example, for network member 2, two telephone numbers (512) 266-9876 and (512) 752-2363 are provided. In a typical implementation, the network member will first initiate contact with network member 2 at the first listed telephone number. If there is no answer, the network member will then call the second listed telephone number. The network member will initiate calls according to the suggestion rule T7 and the backoff rule B4. The suggestion and backoff rules will help to manage communications among network members to minimize the likelihood of receiving busy signals and to efficiently pass communications among the network members.

Figure 14:
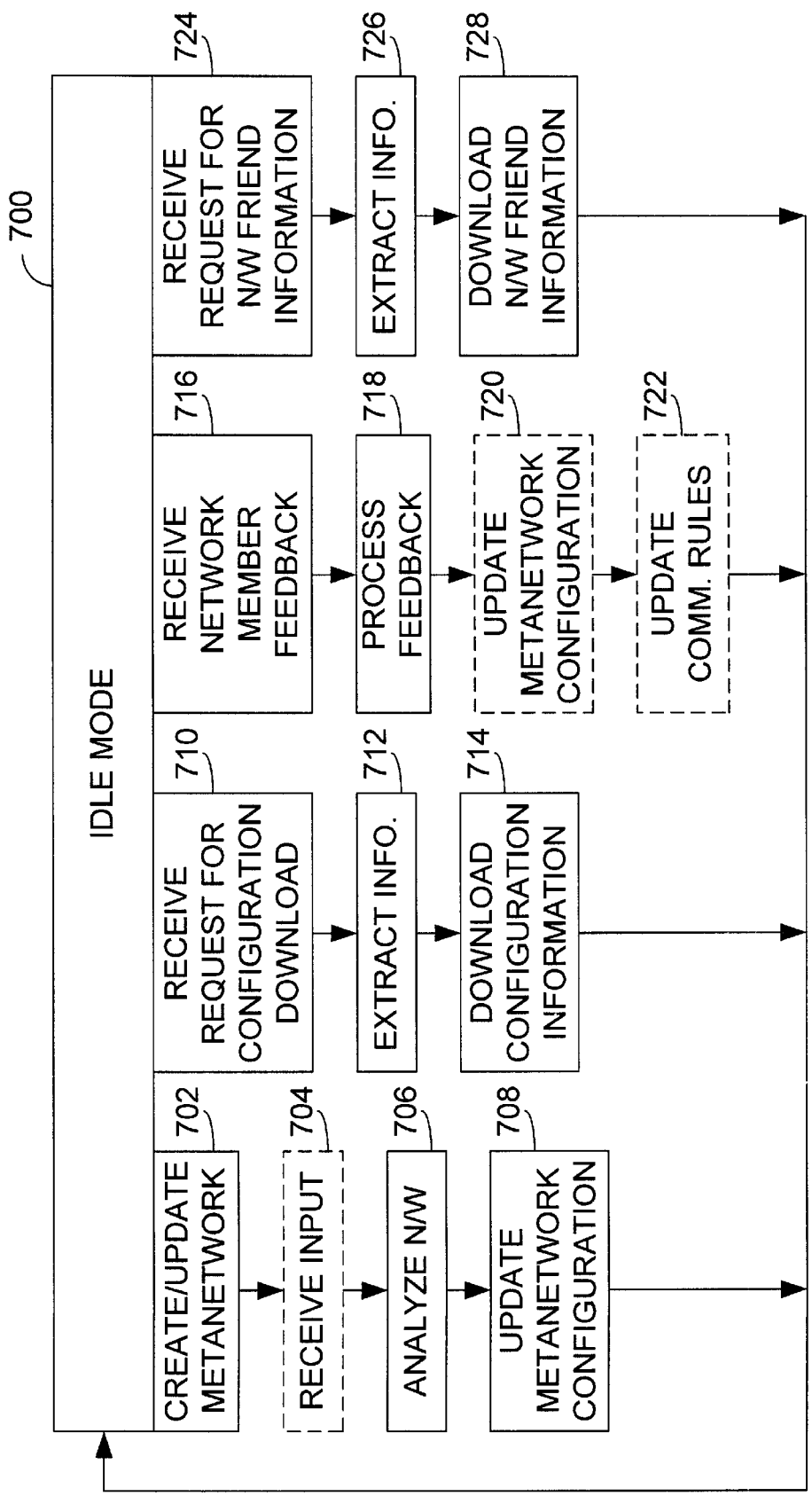
FIG. 14 is a logic diagram illustrating operations of a network friend according to the present invention.

FIG. 14 is a logic diagram illustrating operations of a network friend according to the present invention. As a default operating position, the network friend resides in an idle mode, awaiting the initiation of particular operations. At step 702, the network friend begins creation or update of a metanetwork. When a metanetwork is initially created, a system operator accesses the network friend to manually create the metanetwork. However, during subsequent operations, the network friend may update the metanetwork based upon its own analysis and/or based upon input received from network members of a dynamic manifest network defined by the metanetwork. When the network friend updates a network, it may receive input at optional step 704 from a system administrator. However, when it does not, operation proceeds directly to step 706 wherein the network friend analyzes the metanetwork for potential updates. Then, at step 708, the network friend updates the metanetwork based upon the analysis. From step 708, operation proceeds to step 700.

The operation of steps 702 through 708 may be performed periodically or when additional input (such as from a system operator) is received to update the structure or operation of a dynamic manifest network or when steps are simply taken to update operation of the dynamic manifest network. Because the operations of steps 702 through 708 are taken to attempt to optimize or enhance operation of the dynamic manifest network, the network friend analyzes performance of the corresponding dynamic manifest network and alters the corresponding metanetwork. Such alterations are made in an attempt to optimize the operation of the corresponding dynamic manifest network. Then, the network friend downloads the respective local views to the network members of the dynamic manifest network.

Step 710 is initiated when a request for configuration information is made by a network member. Such request at step 710 may be made upon a network member's joining the network or upon a periodic access of the network friend. Upon such operation, the network friend extracts the requested information at step 712 and then downloads the configuration information to the network member at step 714. Upon an initial access of the network friend, the configuration information downloaded may provide a complete local view of the metanetwork. However, in subsequent operations, an incremental update may be provided. From step 714, operation proceeds to step 700.

Step 716 is initiated when a network member provides feedback to the network friend. Such operation may occur previous to, or subsequent to a download of information as accomplished at steps 710 through 714. Thus, information regarding operation of a dynamic manifest network may be uploaded to the network friend in the same call in which configuration information is downloaded to the network member. At step 716, the network friend receives the feedback from the network member. Then, at step 718, the network friend processes the feedback to determine whether an update is required. If so, the metanetwork configuration is updated at step 720 and corresponding communication rules are updated at step 722. If not, neither step 720 or step 722 are executed. Upon completion, operation returns to step 700.

Additional server information may be available to network members. An example of additional server information is yellow-pages advertisements in the form of HTML pages, JAVA applets and EDI forms, among others. Merchants may purchase advertising and catalog space on the network friend. Alternatively, some or all catalog information may be provided to the network members on a CD ROM. Upon a request for a catalog, a catalog update or other information at step 724, the network friend extracts the information at step 726 and downloads the server information to the network member at step 728. In one embodiment, a majority of the catalog information is delivered to the user in a CD ROM, with additional information, e.g. pricing information, alterations, product availability, ordering information contained on the network friend. Upon an access, then, the network member obtains additional information, as it requires for the particular task at hand.

An example of such an operation would be when a merchant employed the network friend to facilitate secure transactions. To enable a secure transaction, the merchant requires that the transaction take place in a secure fashion. Thus, a network member obtains contact and ordering information from either a locally served directory of such information or from the network friend if such information is not available locally. The network member then uses this information to contact the merchant directly to process the order, minimizing the risk of performing the on-line transaction. Other such operations will be described further herein.

Figure 15:
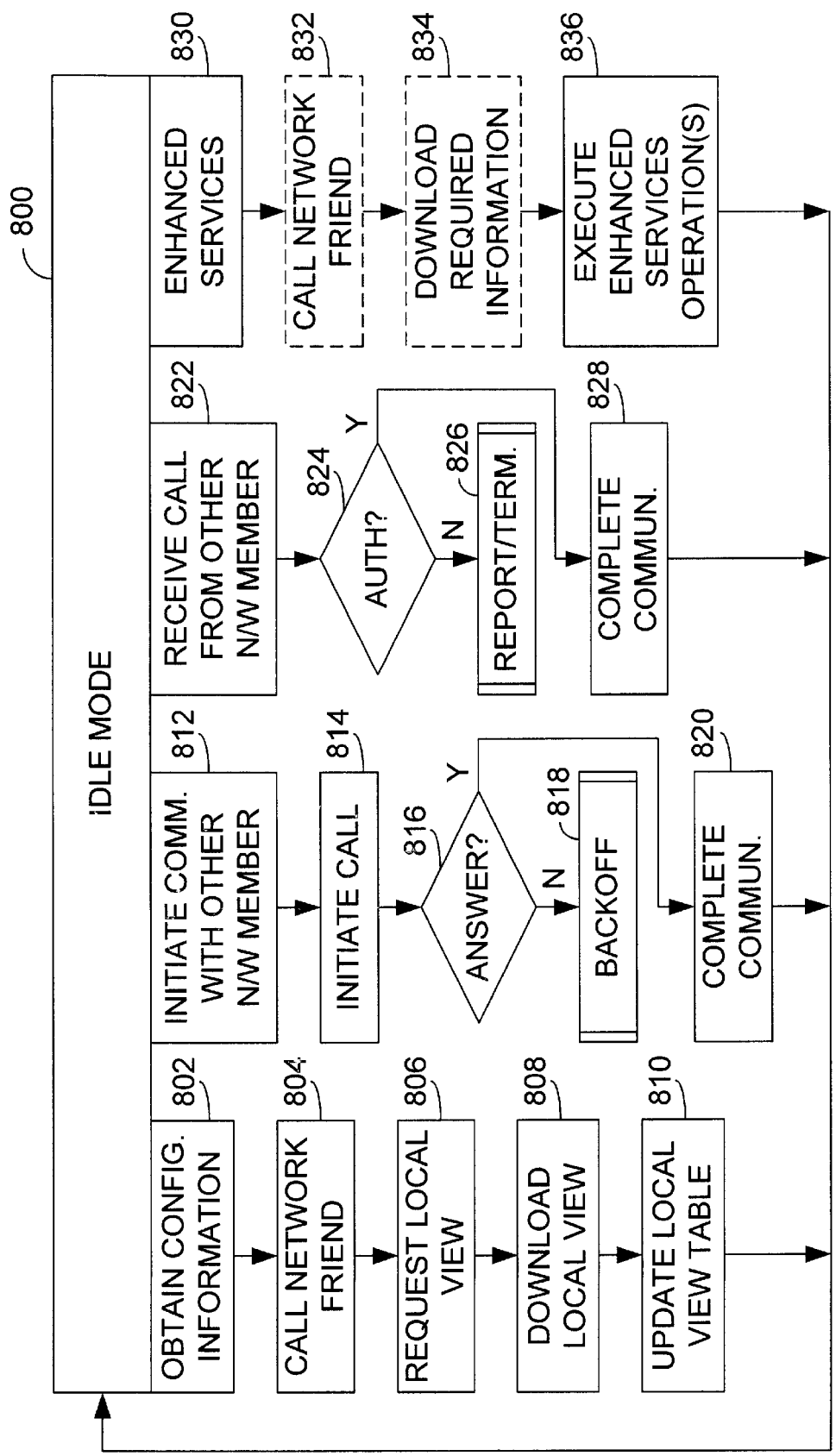
FIG. 15 is a logic diagram illustrating operations of a network member according to the present invention.

FIG. 15 is a logic diagram illustrating operations of a network member according to the present invention. Operation commences at step 800 wherein the network member remains in an idle mode until particular operations commence. One such operation occurs at step 802 wherein the network member seeks configuration information regarding the dynamic manifest network(s) of which it is a network member. Operation continues to step 804 where the network member calls the network friend and then requests a local view of the metanetwork (or local view update) at step 806. The network friend then accesses a corresponding metanetwork and downloads the local view (or local view update) at step 808. In response, the network member updates its local view at step 810. The local view may be a table, database, set of SQL commands or such other rules or structure that adequately describes the local view.

At step 812, the network member initiates communications with another network member. Upon such initiation, the network member retrieves the phone number (or IP address) of the target network member and initiates a call at step 814. If the target network member answers or responds at step 816, the communication is completed at step 820 and serviced until it is done, at which time operation returns to step 800. If a busy signal (or no response) is received at step 816, the target network member does not answer or the link is otherwise not established, the network member executes a backoff rule according to its local view. From step 818, operation could return to step 814 after a backoff period or may return to step 800, as the backoff rule directs. These operations are noted and stored by the network member. Further information that is noted and stored includes busy signals, length of calls and other information relating to the communications, including the success or failure of an attempted communication, the duration and data transfer size of a successful communication, frequency of communications between network members and other relevant information. Then, when requested, this information (or an analysis thereof) is uploaded to the network friend.

At step 822, the network member receives a call from another network member. Upon receipt, the network member authenticates the call at step 824 to determine if the calling party is a network member. If the call is authentic and other constraints are met, the network member completes the communication at step 828 and services the communication until it is done, at which time operation returns to step 800. If authentication fails at step 824, a report is generated and the call is terminated. This report may be uploaded to the network friend to update the metanetwork corresponding to the dynamic manifest network. From step 824, operation returns to step 800.

At step 830, the network member accesses enhanced services of the network friend, such as the product sale services described above. If accessing the enhanced services requires calling the network friend, the call is made at step 832 and information is downloaded at step 834. If not, operation proceeds directly from step 830 to step 836. At step 836, the network member executes the enhanced services operations. From step 836, operation proceeds to step 800.

Figure 16:
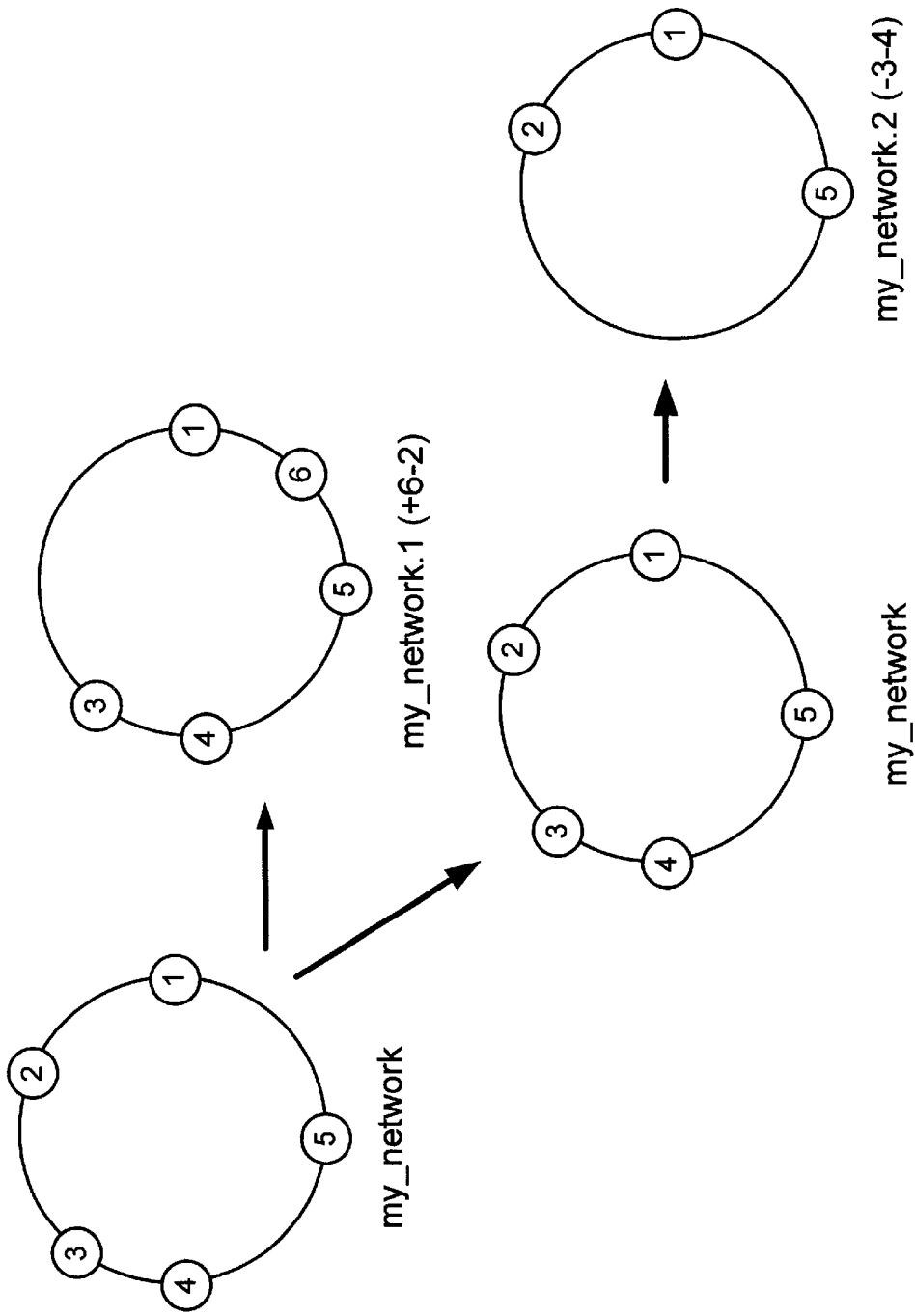
FIG. 16 is a block diagram illustrating operation according to the present invention in moving forward in the creation of new networks when alterations are requested.

FIG. 16 is a block diagram illustrating operation according to the present invention in moving forward in the creation of new networks when alterations are requested. Such operations are employed in the maintenance of networks constructed according to the present invention. The network maintenance strategy determines how new members are to be added or removed from the network. The technique disclosed in FIG. 16 is a move forward strategy. Under the move forward strategy, any network member may propose a change. All proposed changes are sent to all members by using a standard form. All members who accept the change are part of a new network (unless the change was to drop them). The new network has the same name prefix as the old network, along with a number suffix. Each network name also has a note field summarizing the change. If the old network is deleted by the user, then the user is removed from the old network, and the appended number is removed from the new networks name. This method allows networks to split and to evolve with minimum effort. Note, network names may be only local handles for the networks. Each member on a given network may have a different name for it.

For example, consider the following events, as shown in FIG. 16. Someone on a 5 user network (my_network) proposes the addition of a sixth user, but user 2 does not agree. This would cause the creation of a new network which contains the new user, user 6, but does not contain user 2 (my_network. 1 (+6−2)). The original network also remains in tact. Then after some discussion an argument ensues, and users 3 and 4 decide to drop from the original network. The move forward flow of network creation would leave my_network intact and also create my_network.2 (−3−4).

As another example, consider the case that all the users of the network except user X care to drop user X from the a network. The following procedure may be used. First, a network member proposes dropping X from the network. Everyone on the network except X agrees, this causes the creation of a new network which contains all the members except X. The members then drop themselves from the original network. Should there be a disagreement, say users A, B, C care to drop X, but users U, V, and W care to keep X, then B, and C would agree to the drop proposed by A—thus causing the formation of a new network with A, B, C. A, B, and C may then remove themselves from the original network.

As an alternative to move forward the supervisor strategy may be used. Accordingly, one of the network members is responsible for maintaining the network. This supervisor must fill out forms to add or remove people. The supervisor can assign someone else to be supervisor either temporarily or on a permanent basis. Obviously, if the supervisor's machine is broken into, then a hacker could change the network configuration. It is best if the supervisor's machine is not connected to a LAN or to the Internet. Actually, this advice is true in general. Another approach is to use a committee to maintain the network. A committee is a subset of the members of the network. Anyone in the committee may propose changes, and the proposed changes are mailed to the other committee members. These changes take effect depending on the committee strategy. This strategy is either veto or vote. In any case, the changes go into effect after a short time after ratification.

Figure 17:
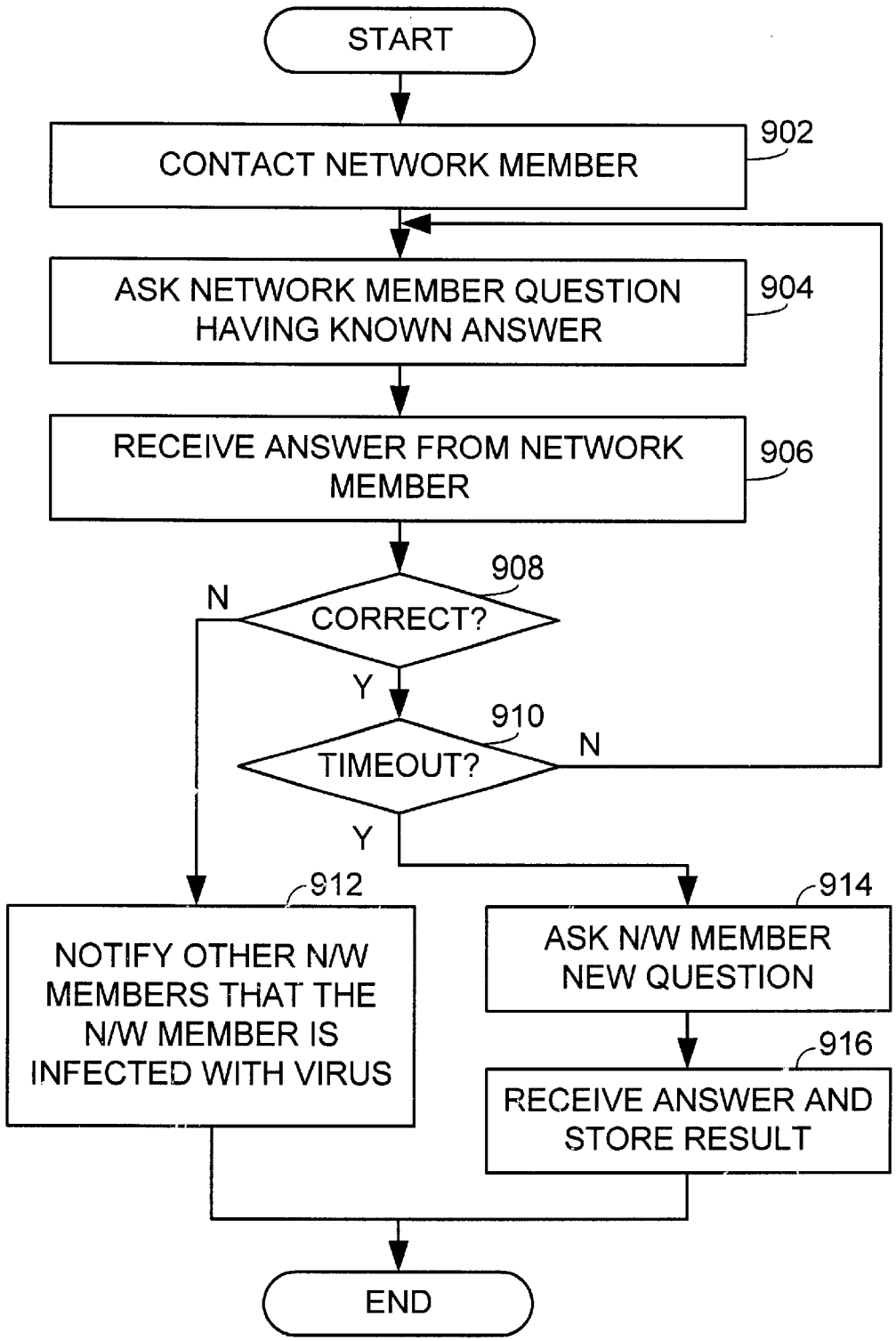
FIG. 17 is a logic diagram illustrating operation of a network friend in authenticating a network member and/or in determining whether a network member has become infected by a virus.

FIG. 17 is a logic diagram illustrating operation of a network friend in determining whether a network member has become infected by a virus or has otherwise failed to operate properly, e.g., has a security problem. Operation commences at step 902 wherein a first network member (or network friend) contacts a second network member. Upon contacting the second network member, operation proceeds to step 904 wherein the first network member asks the second network member questions to which the first network member knows the answers. In one example, the first network member selects a token which it knows should be in the possession of the second network member. The second network member answers the first network member, indicating whether it has the token in its possession and the first network member receives the response at step 906. If the answer is incorrect, as determined at step 908, the first network member notifies the other network members (or network friend) at step 912 that the network member under consideration has been infected by a virus.

However, if the answer received is correct, as determined at step 908, operation proceeds to step 910 where it is determined whether a timeout condition has occurred. If a timeout has not occurred operation returns to step 904. At step 904, another question is selected (e.g., what is the identity of the token having this token?, do you possess this token?, what token is identified with this token?, etc.) After a number of these questions have been answered correctly, by passing through step 904 multiple times, the probability that the second network member has been infected by a virus is miniscule.

If a timeout has occurred, as determined at step 910, operation proceeds to step 914 where the first network member asks the second network member at least one new question. The answer(s) are received at step 916 and stored by the network friend at step 916 for future use. At this point, additional information may be passed between the network members for user in future operations. For example, the first network member may pass a token to the second network member that had been previously received from a third network member. The history of these tokens may be later used to authenticate users and/or to determine whether one of the network members has been infected by a virus. From both steps 912 and 916, operation ends. Note that the network friend performing virus detection may be a dedicated network friend or a peer network member.

Figure 18:
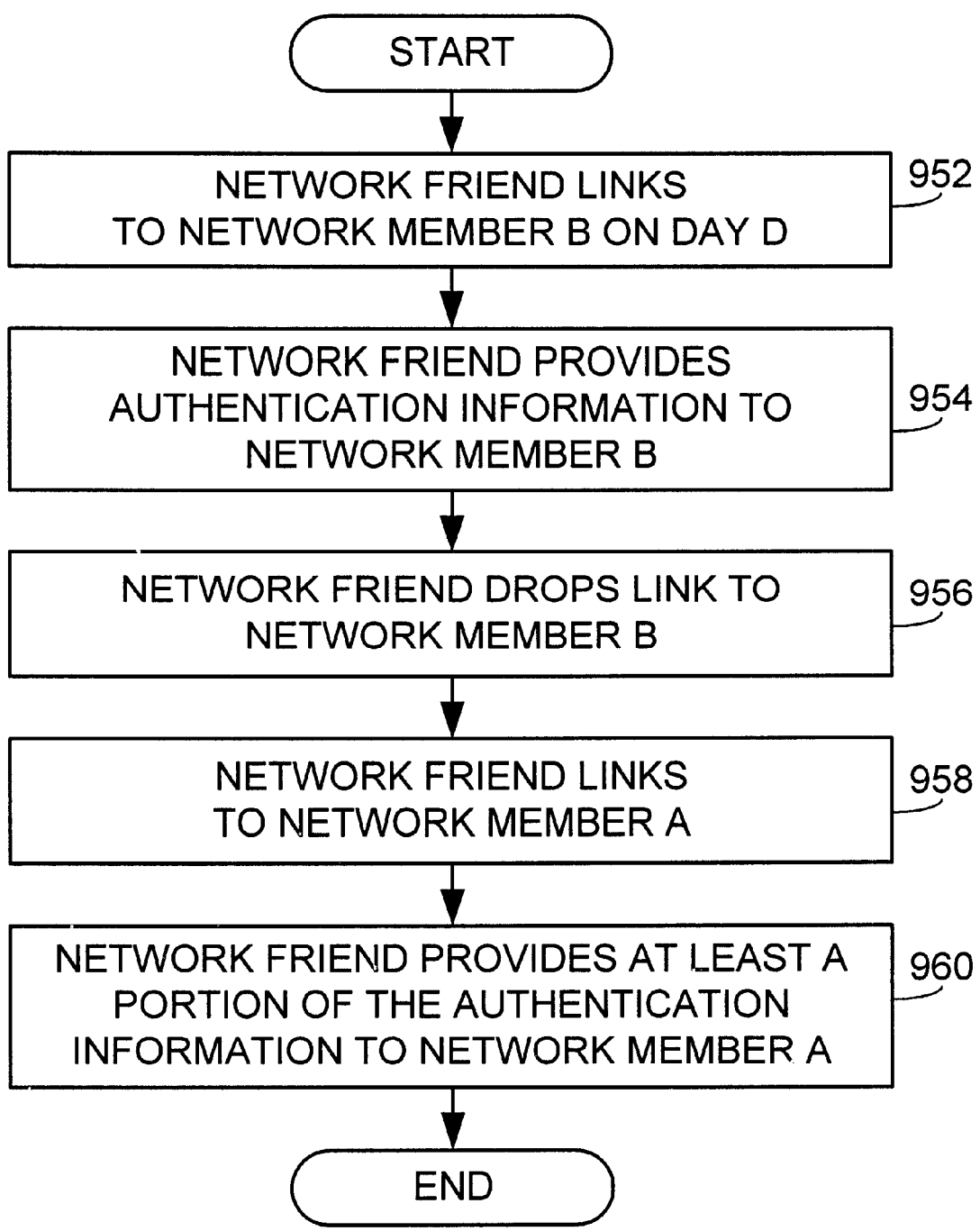
FIG. 18 is a logic diagram illustrating operation of a network friend in dispersing authentication information to network members for future use in authenticating each other.

FIG. 18 is a logic diagram illustrating operation of a network friend in dispersing authentication information to network members for future use in authentication operations. This authentication information may include tokens having identifiers, token histories and random tokens. However, the authentication information may include other information as well, such as a history of prior link formation, a history of the membership of the network, a history of the order in which members were added or deleted from the network and additional information.

Operation begins at step 952 where the network friend (or another network member) links to network member B on day D. Then, at step 954 the network friend provides authentication information to the network member B. The network friend then drops the link to the network member B at step 956. The network friend then links to network member A at step 958 and provides at least a portion of the authentication information to network member A that was previously provided to network member B at step 960. From step 960, operation ends even though the steps of FIG. 18 are repeated over time to update and add to the authentication information. These steps may be repeated for network member to network member communications as well.

By adding to, and updating the authentication information over time an expansive set of authentication information may be generated and disseminated to the network members. With the large set of authentication information disseminated to the network members, the probability that a sniffer or other network interloper can disguise itself as a network member decreases significantly. Further, according to the technique discussed with reference to FIG. 17, a large volume of authentication information decreases the likelihood that an imposter could violate the network to establish an illegal link.

Based upon the age, distribution history and complexity of the particular authentication information, e.g., token, a probability may be assigned to each token that it may be violated. The probability assigned to each token will change over time. Typically, newer tokens will have a lower probability of being violated. However, a token that has been available but unused for a long period of time will have a low probability of being violated. By combining the probability of tokens during an authentication operation, a set of tokens may be selected which will meet a probability threshold such there is sufficient probability that an authentication operation will be valid.

Keys may also be used for encryption/decryption purposes. In such case, each network member of two network members may indirectly refer to one or more a particular tokens. Such reference and selection of tokens will not be performed until the authentication operation has been completed. These tokens may be combined by each of the network members and used for encryption/decryption purposes. Thus, encryption/decryption may be performed without the exchange of tokens between the network members. This additional level of security provides still greater confidence that any sensitive information sent upon an established link between network members will not be compromised. Keys may be combined differently for each encryption/decryption operation across a link. These tokens may be combined so that they have the same length as data being transmitted. Using this technique, utmost security may be achieved. Such a technique is referred to as a "write once pad."

Figure 19:
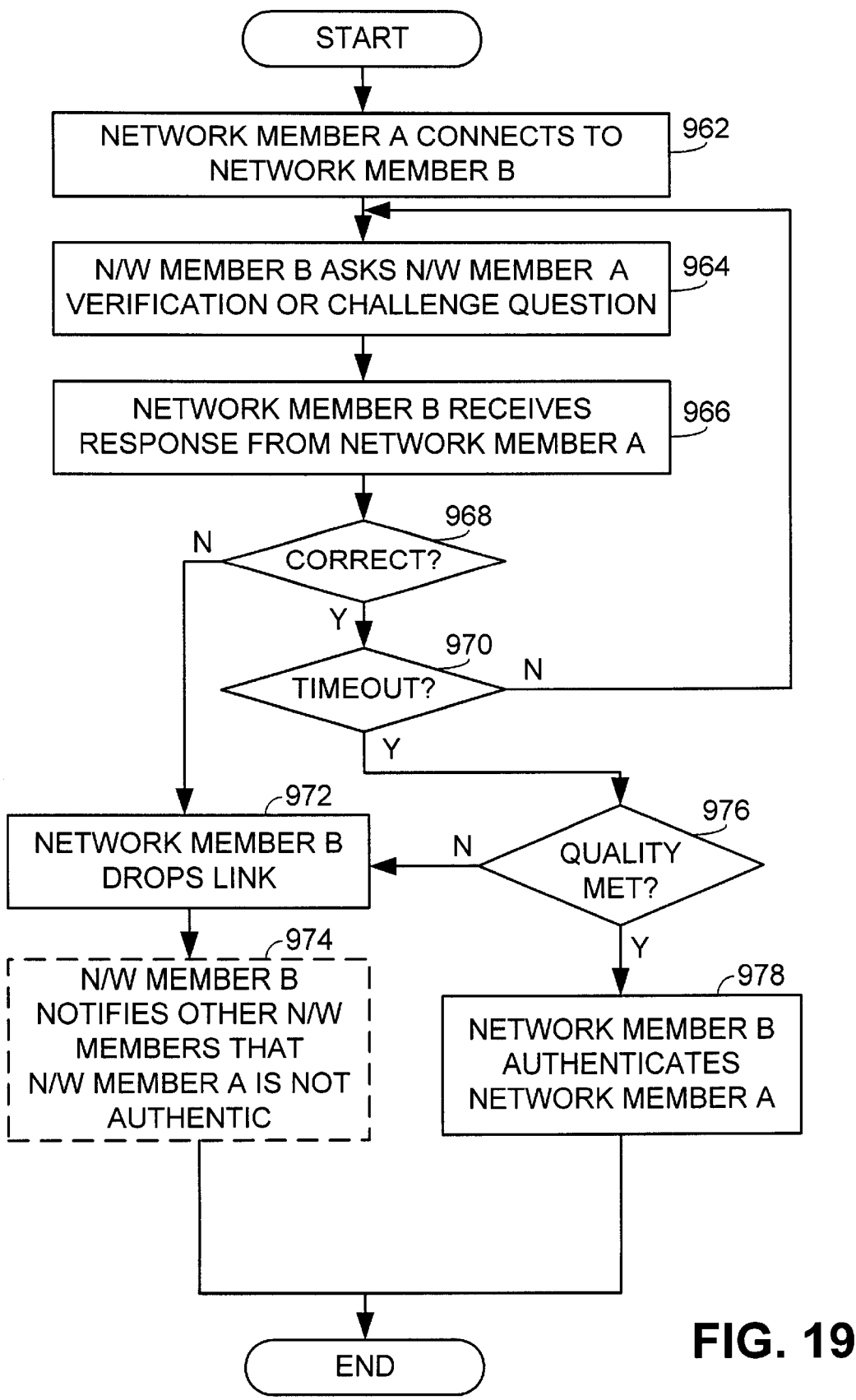
FIG. 19 is a logic diagram illustrating operation of two network members in which a first network member authenticates a second network member based upon authentication information previously received from a network friend.

FIG. 19 is a logic diagram illustrating operation of two network members in which a first network member authenticates a second network member based upon authentication information previously received from a network friend (or from another network member). This operation is similar to the operation of FIG. 17 which determined whether a network member was infected by virus. However, the operation of FIG. 17 is concerned with the authenticity of a network member. Thus, as is evident, these operations provide benefits for both purposes. In the operation of FIG. 19, network member B is attempting to authenticate network member A, i.e., that network member A is who he or she claims to be.

Operation commences at step 962 where network member A establishes a connection to network member B. As a first line of authentication, network member B may receive the caller ID of network member A. If this caller ID is not recognized as being from a network member, network member B will not receive the call. However, because network member A may be mobile and not be calling from a previously known caller ID, network member B may choose to accept the call. Of course, according to the orchestration rules in place, network member B may choose to accept calls of an unknown caller ID only during those time periods it expects to receive a link request from a user. Further, orchestration rules may also operate to reject calls from network members (and non-network members) received during incorrect time slots.

Once the connection has been established to network member A from network member B, at step 964, network member B asks network member A an authentication question. This authentication question may take many forms. One particular form it may take relates to tokens or tokens that have been generated for the purposes of authentication and encryption/decryption. The questions used at step 964 may relate to tokens generated by the network friend and/or by a network member. As was described, these tokens may include a token identifier, a token history and a token (randomly generated number). Each network member may generate local random tokens that are used to create tokens or used by themselves. These tokens may be generated on demand, or placed in a pool from which they are drawn as needed. These tokens are randomly generated so that they have a low probability of being guessed. In one embodiment, the tokens are of variable length to further reduce the probability of being guessed. As has also been described, these tokens may migrate from network member to network member. In some embodiments, the movement of these tokens will be carefully logged. This movement may be incorporated into a token history, which may also migrate.

To enhance security of these tokens, initial sets of tokens will be exchanged via a secure channel or via secure delivery. Alternatively, an initial set of tokens may be exchanged via multiple channels. In such case, a low probability exists that an attacker could listen to all, or most of the channels so as to intercept all token pieces and reconstruct the tokens. Once an initial set of tokens has been exchanged, this set may be used for encryption/decryption that will allow additional tokens to be exchanged between network members. Primary migration of tokens occurs when the token passes from one network member to another network member. Secondary migration occurs when the same token passes to a third, fourth, fifth, etc., network member. For example, primary migration of a toke occurs when a token created by network member X is sent to network member Y. Secondary migration of the token occurs when the token is sent from network member Y to network member Z, from network member Z to network member Q, and so forth. This migration may be tracked as the token history. Further, all of this information may be used when a network member questions another network member for authentication purposes. Further, all of this information may be used by the network members in referring to particular tokens that are used for encryption/decryption purposes.

When network member B is attempting to authenticate the identity of network member A, network member A claims a certain identity. Thus, network member A must prove its identity. Network member B may choose to ask questions of network member A relating to tokens that network member B distributed and which the real network member received, either directly from network member B or through migration.

In a forward operation, tokens that have been migrated from network member B to network member A are considered. In a first forward operation, network member B asks network member A to return a token that was previously migrated to network member A from network member B (step 964). Reference to the migrated token may be by token identifier, may relate to a migration time, or to other token characteristics. Network member A must return a token that has the attributes of the requested token. Upon receipt of the token (step 966), network member B determines whether the token is authentic (step 968). This operation is referred to as a "forward based token verification operation."

In another forward operation, network member B presents a token to network member A and asks network member A whether it has previously seen the token (step 964). Network member B then receives a yes or no answer from network member A (step 966). This operation is referred to as a "forward based token challenge operation." An answer to the question at 968 is incorrect if (a) the token has not been provided (or migrated) to network member A but network member A replies that it has seen the token; or (b) the token has been provided to network member A but network member A replies that it has seen the token. Alternatively, an answer to the question is correct if (a) the token has not been provided (or migrated) to network member A and network member A replies that it has not seen the token; or (b) the token has been provided to network member A and network member A replies that it has not seen the token.

In a reverse operation, tokens that have been migrated from network member A to network member B are considered. In the case of a "reverse based token verification operation," network member B asks network member A to send a token that it has previously distributed to network member B (step 964). Network member A responds by sending a token to network member B (step 966). Network member A has responded correctly to this operation if the token has been previously migrated from network member A to network member B (step 968). In the case of a "reverse based token challenge operation," network member B sends a token to network member A and asks network member A if it previously migrated the token to network member B (step 964). Network member A responds with a yes or a no (step 966). Network member A has responded correctly to this operation if the token had been previously migrated from network member A to network member B (step 968).

If the answer at step 968 is incorrect, network member B drops the link to network member A at step 972 and optionally notifies other network members that the network member A is not authentic at step 974. However, if network member A answers correctly, as determined at step 968, network member B determines whether a timeout condition has occurred (step 970). If not, operation returns to step 964. However, if a timeout condition has occurred, operation proceeds to step 976 where it is determined if the authentication operation has met a minimum composite quality threshold level. If the operation has not met this level of quality, operation proceeds to step 972. If so, network member B authenticates network member A (step 978). From both step 974 and step 978, operation ends. Then, these operations are repeated for the authentication of network member B by network member A.

In an alternate embodiment of steps 964 and 966, some questions asked are legitimate questions while other questions are illegitimate questions. The claiming network member must correctly answer both the legitimate questions and the illegitimate questions to correctly authenticate itself. In this case, both legitimate and illegitimate tokens will be passed from one network member to the other network member. Thus, a sniffer collecting the tokens will not be able to determine which of the tokens are valid and which are not.

In one embodiment, the timeout period considered at step 970 is set to be a fixed number, e.g., 10 iterations of steps 964 and 966. This timeout period is set to meet a certain lower level of confidence that the authentication operation is correct. To achieve a positive authentication, a composite quality threshold must be met at step 976. As was previously described, each token may have associated with it a probability of being secure (not intercepted). For example, tokens migrated across the Internet are less secure than tokens migrated across the PSTN. Thus, a positive authentication operation for each token will result in a particular quality. For successful iterations of steps 964 and 966 for the timeout period, the qualities are combined to produce a composite quality. However, this composite quality must exceed the composite quality threshold at step 976 to result in a positive authentication. In another embodiment, step 968 is optional and steps 964 and 966 are iterated for a timeout period, independent of whether a single, or multiple, incorrect answers are received.

The questions of step 964 of FIG. 19 may be performed with tokens that have been secondarily migrated to either network member A or network member B. In such an operation, the verification and challenge operations may be specified to tokens secondarily migrated to either network member A or network member B from another network member.

Figure 20:
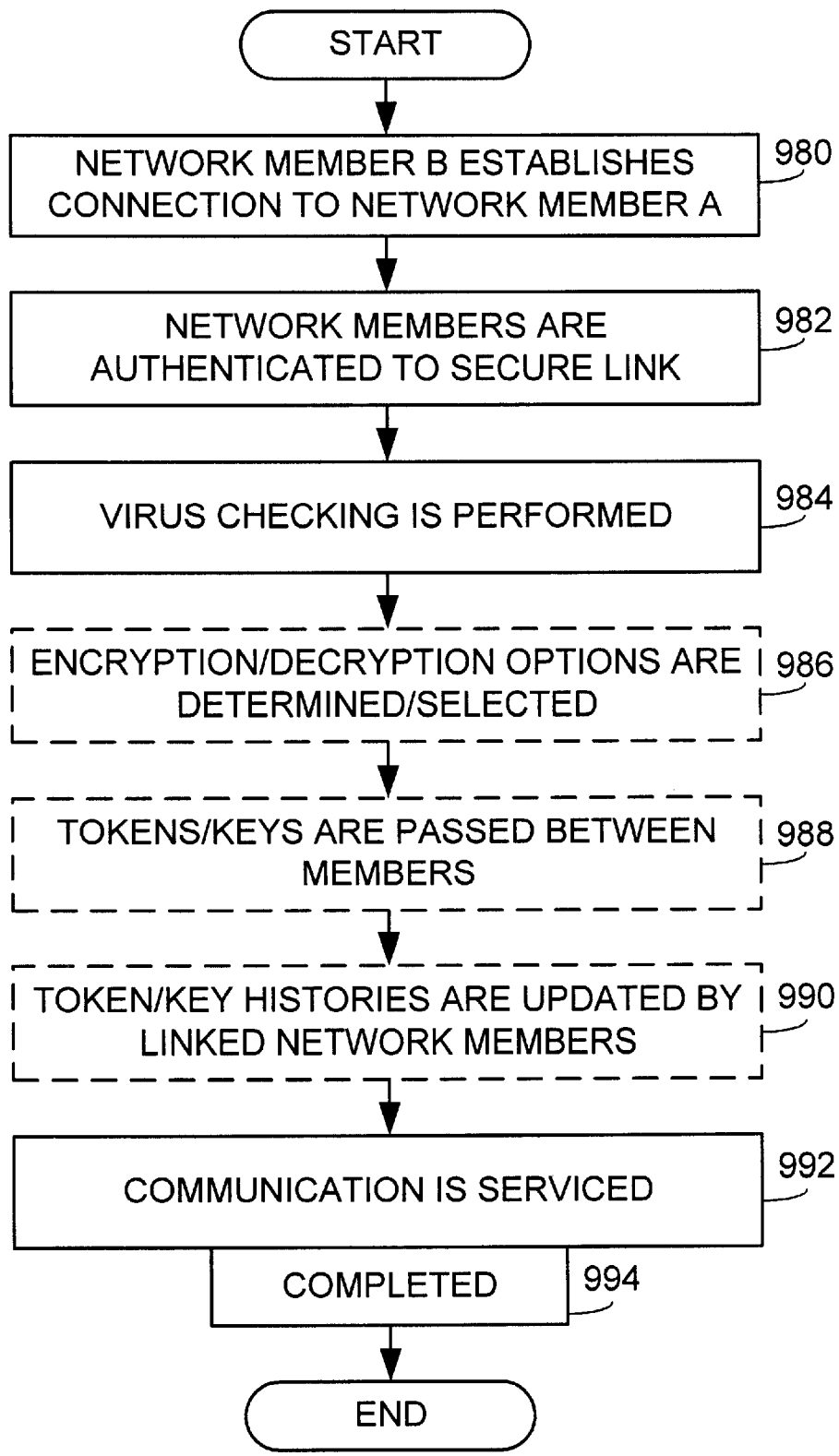
FIG. 20 is a logic diagram illustrating generally operation according to the present invention in establishing communication between network members.

FIG. 20 is a logic diagram illustrating generally operation according to the present invention in establishing communication between network members. Operation commences at step 980 wherein network member B establishes a connection to network member A. The establishment of this connection is in accordance with the local view of a metanetwork possessed by network member B. Once this connection is completed, the network members authenticate one another to confirm that they are whom they claim to be (step 982). Then, virus checking is performed between the network members to confirm that they have not been infected by a virus (step 984). If one of the network members has been infected by a virus, the other network member may choose to terminate the link formation and to issue a report to other network members or the network friend (if available) to report the infection.

The network members may then elect to employ encryption/decryption for the communications that will be serviced by the link (step 986). The network members may then choose to pass additional tokens between themselves (step 988). If additional tokens are passed between the network members, the token/token histories are updated by the network members for further reference. This token/token history may be passed to other network members and/or the network friend during subsequent communications. The communication is then serviced (step 992) until its completion (step 994), at which point the communication ceases.

Figure 21A:
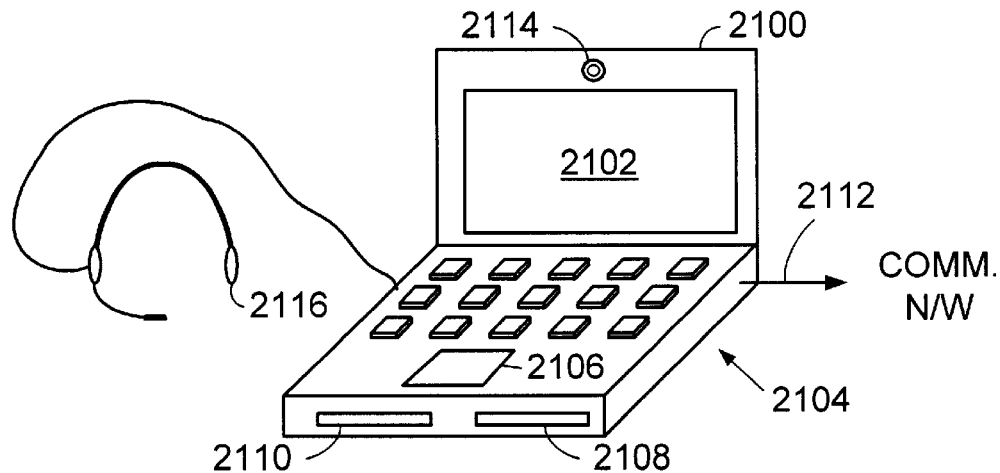
FIGS. 21A, 21B and 21C illustrate particular constructions of a client communication device that operate according to the present invention.
Figure 21B:
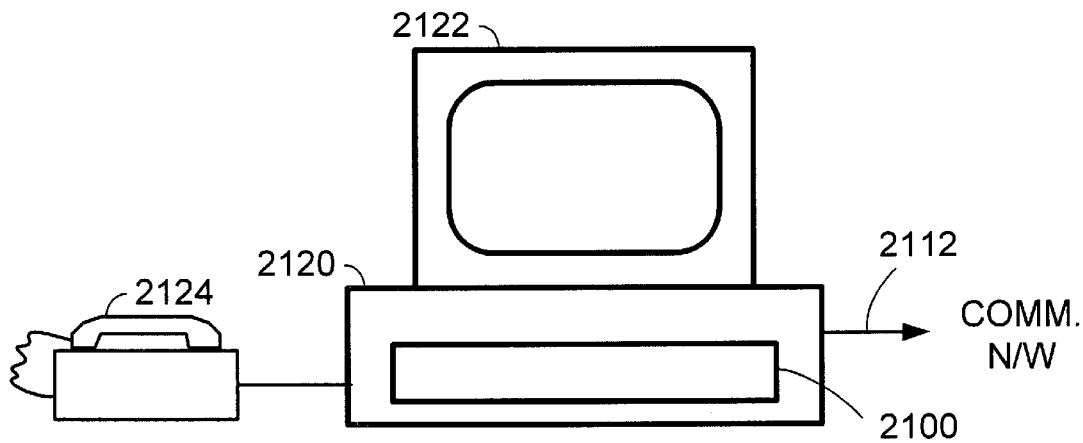
Figure 21C:
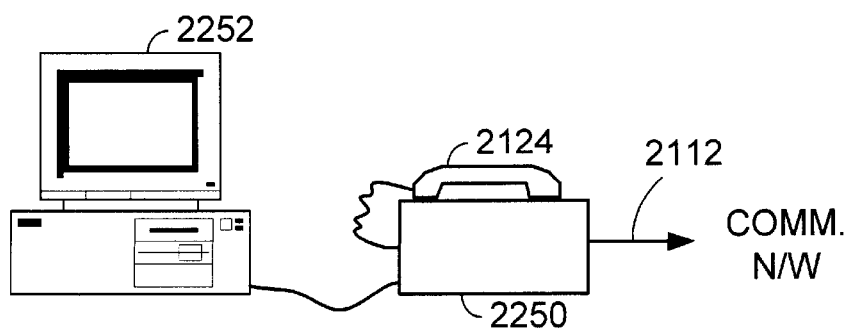

FIGS. 21A, 21B and 21C illustrate particular constructions of a client communication device that operate according to the present invention. Referring now to FIG. 21A, a dedicated communications device 2100 provides both telephone and PC functionality and facilities metanetwork communications according to the present invention. This dedicated communications device 2100 may be referred to as a SecureStation™ and the software running upon it is referred to as the BEAssured™ software. In such case, a network friend that supports operation of a plurality of the SecureStations™ is referred to as the BEAFriend™ platform. As is shown, the dedicated communications device 2100 includes a display 2102, a tokenpad/tokenboard 2104, a touchpad pointer interface 2106, a floppy diskette drive 2108, a CD ROM drive 2110 and a communication link 2112 that couples to a communication network. The dedicated communications device 2100 may also include a video camera 2114 and/or a headset 2116.

In the construction illustrated, the dedicated communications device 2100 provides both telephone and PC functions. Thus, a mobile employee may use this device to perform traditional laptop PC functions as well as communication functions, such functions including word processing, spreadsheet functions, etc.. The communication network interface 2112 may be multifunctional to provide modem functionality, ISDN router functionality, wireless network functionality and other functionality so as to enable the dedicated communications device 2100 to couple to various types of communication networks. Because the dedicated communications device 2100 is isolated from unsecured communication paths, e.g., the Internet, documents stored on the device are secure as are the communications it does facilitate. However, in another embodiment, the dedicated communications device 2100 is allowed to access the Internet, so long as an internal firewall is created to protect the security of the device.

The built-in headset 2116 allows a user of the dedicated communications device 2100 to use the device as a telephone. Further, the video camera 2114 allows the dedicated communications device 2100 to support teleconferencing. Thus, the dedicated communications device 2100 may replace both a user's telephone and the user's PC.

Referring now to FIG. 21B, the dedicated communications device 2100 may include a docking station which provides additional PC and/or telephone functionality. As shown, the dedicated communications device 2100 docks into the case 2120 of the docking station. The docking station further includes support for another display 2122 and provides an outlet for the communication link 2112. In one embodiment, the dedicated communications device 2100 does not support ISDN or DSL communications because they are not accessible while traveling. Thus, the docking station includes an ISDN or DSL router which couples to the dedicated communications device 2100 through a docking station interface. Other functions may also be offloaded to the docking station. The docking station may also include an additional audio interface such as a handset phone 2124 and/or another video camera (not shown) which allows the user to perform video conferencing while the dedicated communications device 2100 is docked.

FIG. 21C illustrates a dedicated interface unit 2250 that couples a PC to a communication network and performs the communication network functions of the present invention. In the particular embodiment, the dedicated interface unit 2250 includes a handset 2124 or another audio interface unit. The dedicated interface unit 2250 includes a communication link 2112 and an interface to a PC 2252. The dedicated interface unit 2250 supports all audio requirements of the user in addition to the functions provided according to the present invention. Thus, the dedicated interface unit 2250 replaces the telephone as a desktop appliance. The dedicated interface unit 2250 could also include storage capability for the PC 2252 that is more secure than that resident on the PC 2252.

In another embodiment of the dedicated interface unit 2250, the unit does not provide audio interface capabilities directly but, instead, sits in the position of an external modem, ISDN or DSL router for a coupled PC. However, instead of just performing the functions of such an external device, the dedicated interface unit 2250 performs the functions of the present invention in facilitating network communications for the coupled PC. In this configuration, the dedicated interface unit 2250 functions as a black box, providing the network communication functions. Client software may be required to be loaded onto the PC. However, firmware that is resident on the dedicated interface unit 2250 may solely perform the functions of the present invention in providing communications among the group of network members.

Figure 22:
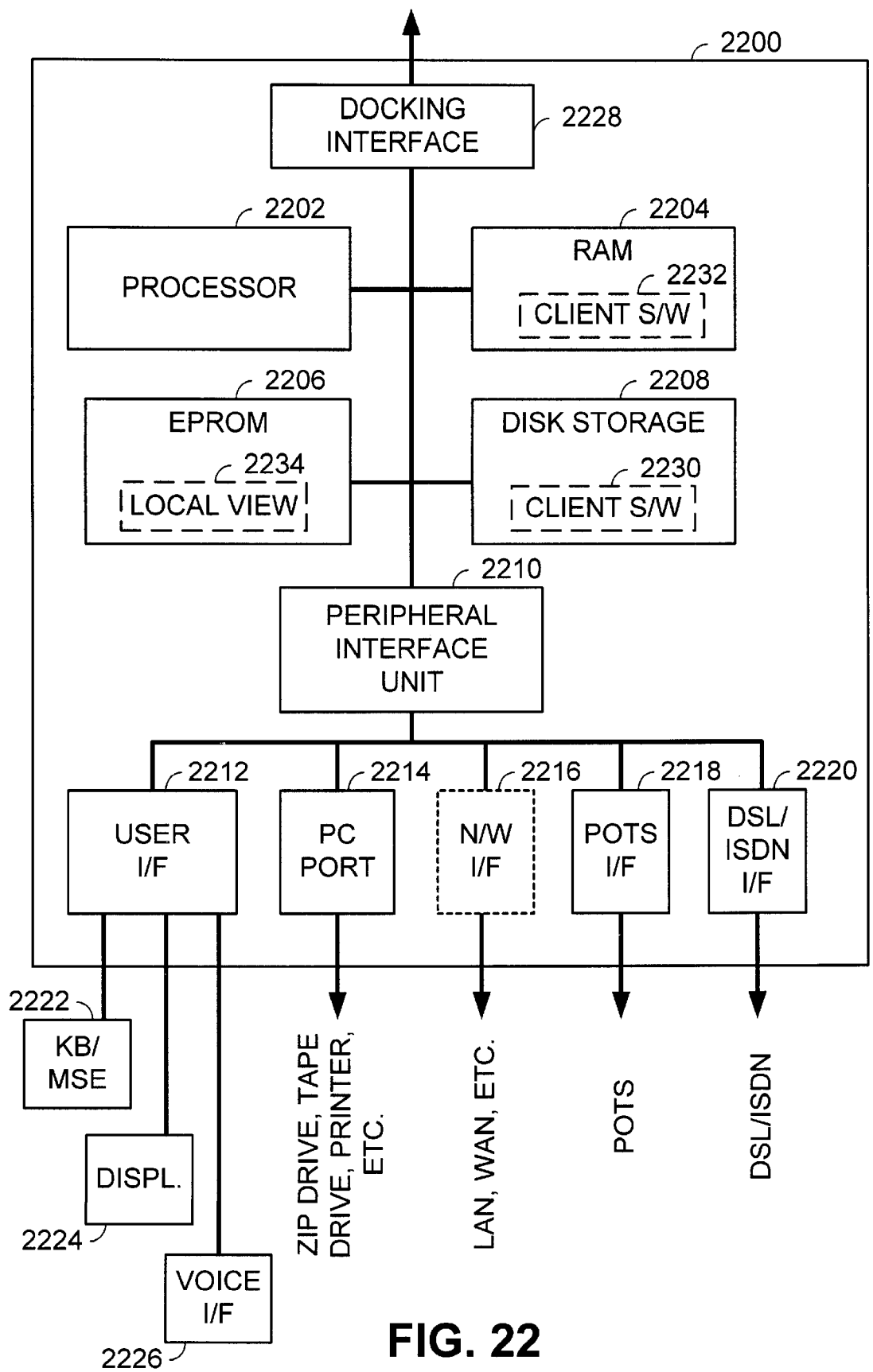
FIG. 22 is a block diagram illustrating generally the construction of a client communication device that operates according to the present invention.

FIG. 22 is a block diagram illustrating generally the construction of a client communication device 2200 that operates according to the present invention. The client communication device 2200 in the embodiment of FIG. 21A will include most, if not all of the components illustrated. However, the embodiment of FIG. 21C will include a subset of these components. The client communication device 2200 includes a processor, RAM 2204, EPROM 2206, disk storage 2208 and a peripheral interface unit 2210 that are coupled via a processor bus. A docking interface 2228 may also couple to the processor bus. However, in another embodiment, the docking interface 2228 will couple to the device via a peripheral bus coupled to a second side of the peripheral interface unit 2210. These components are generally known in the art and will not be described further except as to expand upon the teachings of the present invention.

The peripheral interface unit 2210 couples the processor bus to a peripheral bus. Coupled to the peripheral bus are a user interface 2212, a PC port, an optional network interface, a POTS interface and a DSL/ISDN interface 2220. The user interface 2212 couples a tokenboard/mouse/tokenpad 2222, a display 2224 and a voice interface 2226, e.g., handset, headset, video camera, etc., to the client communication device 2200. This user interface 2226 may also provide a button, which causes the client communication device 2200 to record conversations on the disk storage 2208. Thus, with the client communication device 2200 replacing a desktop telephone, the client communication device 2200 provides voice communication functions, including recording functions, telephone directory functions, call routing functions, hold functions, extension functions, etc. The PC port couples peripheral devices such as backup drives, tape drives, a printer, etc., to the client communication device 2200. The network interface 2216 couples the client communication device 2200 to a LAN, WAN or other network. The POTS interface 2218 couples the client communication device 2200 to the PSTN via a modem connection while the DSL/ISDN interface 2220 couples the client communication device 2200 to a PSTN via a digital connection.

Stored on the disk storage 2208 is client software 2230 that enables operation according to the present invention. During an operation according to the present invention, the client software 2230 is loaded into RAM 2204 as client software 2232. The processor 2202 then executes the client software 2232 instructions to accomplish the operations according to the present invention. Because of the importance of the local view 2234 of the metanetwork(s) with which the client communication device 2200 operates, the local view may be stored in EPROM 2234 for added security. A copy of the local view will also be made to the disk drive for backup purposes. A copy may also be archived via the PC port 2214 for additional security.

In the embodiment of the client communication device 2200 of FIG. 21C, the docking interface 2228, the PC port 2214, the network interface 2216, the display 2224 and the tokenboard/mouse/tokenpad 2222 will not be present. Further, the POTS interface 228 may also not be present if the client communication device 2200 couples only to a digital line. As is evident, the client communication device 2200 will have different components in its differing embodiments. However, in each embodiment, the client software 2230, 2232 is required to enable operation according to the present invention.

Figure 23:
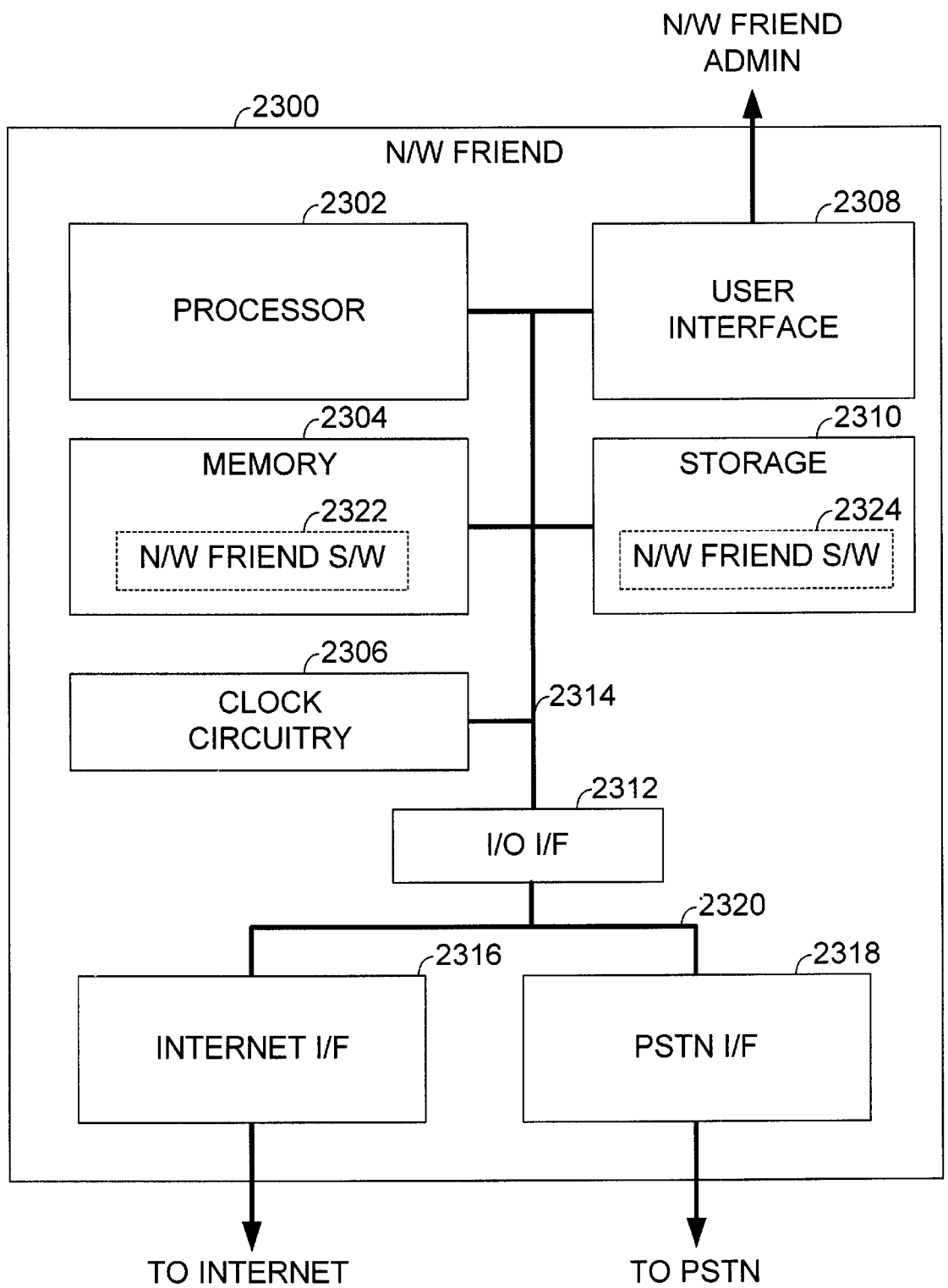
FIG. 23 is a block diagram illustrating generally the construction of a network friend that operates according to the present invention.

FIG. 23 is a block diagram illustrating generally the construction of a network friend that operates according to the present invention. The network friend 2300 is structured essentially as a network server and includes similar components. These components include a processor 2302, memory 2304, clock circuitry 2306, a user interface 2308, storage 2310 and an input/output interface 2312, all of which couple via a processor bus 2314. These components are generally known in the art and will be described only with reference to the present invention.

The input/output interface 2312 couples the processor bus 2314 to a peripheral bus 2320 to which couple an Internet interface 2316 and a PSTN interface 2318. The Internet interface 2316 allows the network friend 2300 to communicate with network members via the Internet to setup and service communication networks according to the present invention. The PSTN interface 2318 allows the network friend 2300 to communicate with network members via the PSTN to setup and service communication networks according to the present invention. Each of these interfaces 2316 and 2318 must provide sufficient bandwidth to service operations according to the present invention. Thus, these connections may be multiple T-1, DS-3, etc. high bandwidth connections.

Network friend software 2324 is stored on the storage device 2310, e.g., disk drive, tape drive, etc., and loaded into memory 2304 as network friend software 2322 for subsequent execution by the processor 2302. As is generally known in the art, the general purpose network friend 2300 performs operations according to the present invention by executing particular instructions.

Implementation

A typical installation of a dynamic network according to the present invention consists of a plurality of network members and interfaces between the network members. Network member software is run on a customer's PC or dedicated communication machine. A network friend is optional and network friend software (if any) runs on machines owned by a service provider or network manager. The network friend contains the metanetwork as previously described. The metanetwork may be analyzed and optimized, and then those optimizations may be passed to the network members via the local view. Node and network statistics are periodically uploaded from the dynamic manifest network (as compiled by the network members) to the metanetwork on the network friend. The network members, who in turn are acting on a combination of information downloaded by the network friend and acquired locally, implement this network in real time. This differs from the conventional network where at least one, and usually both ends, of network links are fixed in place.

The network friend is typically implemented as a group of machines spread over the country in areas determined by market demand. The network friend acts as an orchestra leader—it gives directions and hints to the network members about how to form links, and when to form them. These directions and advice are derived from analysis of the metanetwork, and user preference settings. Each hint or command is encapsulated in one or more suggestion rules. Updates to the communication rules are typically supplied by the network friend to the network members while updating the local views.

In another embodiment, the network friend operates only to perform initial network setup functions. Once these initial setup functions are completed, the network members perform any required additional network management functions. During initial setup, however, the network members may select a feature set to be provided for the network. For example, in a minimal configuration, authentication is limited to checking caller ID, and the additional authentication operations described with reference to FIG. 19 are not performed. Further, encryption/decryption operations may be optional as well. In these cases, each network member may purchase a minimal functionality set and upgrade the functionality set during initial setup with the network friend. Further, upgrades and later enhancements are also made available through the network friend.

A network member may establish one or more links with a network friend or with another network member or both simultaneously, if enough hardware is present. The number of ports available on a machine determines the sum of the number of links that may originate or terminate at that machine. The base service individual customer will typically have two ports. Once links are established between network members, or between network members and network friends, there is a point to point ISDN (or higher bandwidth) connection present or an IP link. Alternate embodiments may use a ADSL, SDSL or other available connections. This point to point link is typically between two network members, but it is periodically formed between a network member and the network friend. When an ISDN link, the link can support real time transactions. ISDN header based "caller ID" fields are used to instantly identify the source of link requests. The ISDN time field in the header may be used to certify the time of transactions. The network member application software is used for sending email, ordering items from vendors, starting videoconferences, etc. These applications are described in more detail in the following subsection.

From the point of view of the user, an activity like sending email will look very much like sending a FAX, as the transaction will occur in real time over a dedicated link; however, the data will remain in electronic form and the transaction will be much faster than a FAX. In the default synchronous mode, short delays before transmission may be added for the purpose of synchronizing network transactions. The network friend provides many of the rules for guiding the application of such delays. The fact that messages are indeed received or orders are made, and the time of receipt of those messages and orders, will be obvious to the users because transaction messages appear on the screen and are entered into a log.

Network members query the network friends only for short times and at discrete, although perhaps variable, intervals. Also, a dial-in only configuration of the network friend may reduce cost. The network friend may be used to hold information about how the network is to be organized. For example, a customer may order a private network to be setup between six subscribers. The names and routing information for these six are kept on the network friend. Each of the six network members periodically downloads an update, or copy, of its view of the network from the network friend and thus each network member has link information. In addition to the link configuration information, the network friend also keeps track of network usage statistics and various access rules.

The network friend may also holds information to help the network members make choices on whom to call. For example it may contain a yellow pages directory and vendor performance feedback information. Once in a while information is exchanged between the network member and the network friend. During this exchange, the network member is given rules to rewrite or to update its link database, and to set the various suggestion rules and back off rules, and the network friend is given information for updating its metanetwork statistics. It is important to update the metanetwork statistics so that further optimization runs can be made.

As mentioned above, according to the current example, the network member initiates link formation. Although it is imaginable that future networks can have network friends that initiate transactions instead. Note that the network friend keeps historical statistics about the availability of network members for link formation, these are then integrated into the metanetwork so that further analysis of the metanetwork may be done in order to increase performance of the manifest network.

Each network member chooses a network friend from the network friend group to use for configuration and rule downloads based on a network friend choice rule. Initially the network member software uses a default network friend choice rule. Later a new network friend choice rule may be downloaded, probably during a configuration update. The network friend identifies each network member when it calls for an update, and in turn only provides information about the network which is appropriate for the calling network member.

The network friend may provide a new network friend choice rule to a network member at update time. This may be done in order to balance network friend loads, for example. Also, network member software may modify the network friend choice rule, for example during an emergency when the designated network friend is not available, the network member may change the network friend choice rule. The calendar time at which the network member dials the network friend is determined by the suggestion rules and backoff rules, again the network member software starts by using defaults, and then later updates such rules in one of many possible manners. In certain cases either the network friend or network member may update rules, and information may be exchanged between network friend and network member, or network member and network member, in order to provide information on how rules can be changed. Rules may be combined into more complex rules. Rules that affect links may be applied to single links or groups of links and operate at the direction of yet another rule.

A suggestion rule tells the network member when the best time to call is, while the backoff rule tells the network member what to do in case the line is busy. The suggestion rule may not be followed in certain situations, as examples: the computer is turned off at the time suggested, the user initiates a reset or panic sequence, the outgoing data connection is being used for something else at the suggested time, the computer's clock is wrong. In the last case, one of the things the network member may do when it talks to the network friend is to synchronize clocks. In a particular embodiment, all machines use the time provided by the ISDN header, when it is available. In another embodiment, Internet standard time (www.time.com) is employed. Otherwise, synchronization will depend upon the network friends. Clock reliability statistics will be tracked and used in setting network parameters. However, the base functionality of the metanetwork does not depend on synchronized clocks. Approximate synchronization is only used only to increase performance.

As an example, a suggestion rule for the network member to network friend link will often have built into it a suggested time for the network member to call the network friend and update its state. The interval of elapsed time may be changed to balance the load that the network friend must carry. Shorter call back intervals increase system load, and longer intervals reduce it. The tradeoff is that longer intervals cause the real network to be slower to respond to changes in the metanetwork. In most cases, once a day network friend network member exchanges will be sufficient. Further, once every two days or three days updates of configuration information is workable. Because of the suggestion rules, calls will tend to dovetail into the network friend. As the consistency of time stamps improves, the margins around connect window time slots may be shortened.

The suggestion rules are not critical, if they fail, the back off rule is applied. The back off rule may push the call to the next suggested time, or may cause a retry, for example. The yellow pages directory can provide call suggestion times for contacting general vendors tailored for the specific network member. Thus the network member will have a higher probability of success when calling a generally accessible vendor. With this type of scheduling bandwidth utilization is expected to be from around 30% to over 70%. Higher efficiency will be possible in special cases where the suggestion rules are extremely effective. After the bandwidth utilization limit is reached, a customer will have to subscribe to more data lines in order to have smooth reliable service. The network friend will know when bandwidth utilization limits are approached because the network friend uploads statistic information about the network at the same time that the network member downloads configuration information. Thus the system operator will usually be able to offer additional service to the customer before critical bandwidth usage situations develop.

Enough hardware must be put in place to react to added customer demand so that the caching interval against the network friend is a standard interval, typically one day. In fact, one way it will be known there is a need for more hardware before the network becomes congested will be to watch the increasing time intervals specified in the suggestion rules. (Note suggestion rules are dynamic; they are changed to keep the network friend load balanced.) This applies to both network member to network friend and network member to network member communications. Note other rules may also be used, and the network member may modify the rules downloaded based on local needs. For example, sometimes a network member may have to reset its downloaded information due to problems with itself, the communication network or other network member difficulties. Also rules may be used for regulating a variety of network member, network friend, and link behavior, and they are not limited to regulating call times. There may be a variety of rules for regulating many aspects of the dynamically configured network. Also rules may be created and applied locally.

Client software that runs on the customer's machine creates and enables a network member. When a customer subscribes to the service, his configuration information is entered into the network friend. Embedded in the configuration information are rules that regulate the connectivity of the network. The network member is not enabled, however, until communicating with the network friend to receive a respective local view of the metanetwork of which it is a member. On each configuration download transaction the network member and network friend exchange various statistics, and rules in addition to configuration information. However, each network member is a view of only the parts of the network that are appropriate for it to connect from/to. Changes in configurations and rules on the network friend side will take effect on the network member, after the procure download.

Note, the network friend may know which network member it is serving instantly based on the caller ID field of the ISDN call header. Also, the network friend is not a general purpose machine—it is not hooked up to any local area network, or to the Internet. The network friend is not even capable of producing a command shell over the network links for example. The activities of a rogue network member, say one that provides incorrect statistics, or that ignores the suggestion rules, will be apparent at the network friend when the network friend updates the network statistics from other network members. Thus rogue network members may be quickly located and shutdown.

The network links are made with direct dial ISDN lines which may be supplied as part of a subscription package. Because ISDN lines dial instantly, links may be established and destroyed at will. For example, when customer A desires to send email to customer B, the email application checks the downloaded rules and then dials B to establish a link, sends the mail directly, and then drops the link. Receipt of the mail is thus immediately verified, and at no time is data in transit exposed to a general-purpose computer—thus eliminating exposures to sniffing programs etc. The only means of attack available are identical to those for a regular phone call. Since the links are direct, caller ID information that appears in the call header accurately identifies the caller. This identification can even be used to bill the caller if B has a business arrangement with A. Also based on the header information, B will reject all undesirable calls. For example, if B was a patent attorney, B might accept secure email only from trusted sources, such as current customers of the firm. Note, this places our desire to identify a caller in line with the phone companies need to identify a caller for billing purposes.

Both network members and the network friends use the caller ID headers for verification of the source of calls. Because of this, many types of security attacks become impossible, it becomes very difficult for an attacker to be anonymous, and it is possible for the phone company to deny service to people who abuse it. Also because network members and network friends use caller ID fields, it is possible to use the audit trail for billing. The network member side software provides a report to the user containing a list who called, when, and for how long. The customer is identified by name and not just by number, as the network friend has provided the information needed for this purpose.

Applications

The dynamic network of the present invention is capable of handling many types of transactions, not just email. Email and other applications are discussed in more detail in this section. In a contemplated embodiment, a customer is provided with one or more of the following packages:
1. a card be placed in the PC that performs operations according to the present invention and a CD ROM for installing the application software;
2. a dedicated communications machine that has a mix of telephone and personal computer functionality;
3. a dedicated gateway machine that services a number of users (and which may couple to a LAN);
4. a dedicated interface unit that looks like an external modem or router and that connects to a serial port, a parallel port, a PCMCIA port, other PC port, etc., of a computer as well as to a communication link and that facilitates communication operations according to the present invention; and 5. computer software loaded onto a computer that allows the computer to perform network member functions using its available resources.

Along with the access package each subscriber may also be allotted a certain amount of long distance charges which are prepaid. After the long distance limits are reached the user must pay for the connect time, charges will follow a tariff structure rule which is provided by the network friend. Thus there will be some advantages to keeping transactions local when possible. Also, the growth of the network will be facilitated by a natural regulation mechanism, since more funds will be available in places where there is demand for more hardware. Charges for excessive long distance usage will also keep users mindful of frivolous uses of the network. Finally, would be attackers will have to hack at their own expense. This alone will probably significantly raise the security of the network; although more formidable safeguards may be placed, as described in the previous subsection.

In the first particular implementation of the present invention, an individual subscriber receives an ISDN connection, a card to plug into his/her computer, and a CDROM with the application software. The customer for this type of access probably uses his or her PC for other applications, and may even have access to a LAN or the Internet from the same machine. Such a user has very secure transactions over the metanetwork, but has exposures to viruses and possible attacks through the conventional network connection.

The dedicated communications machine is communicates with the network friend(s) and with other network members. It has a disk drive that may be used for storing data, a communication system interface, a display, input devices, ports for printing, archiving data, etc. and may include a headset and/or handset for voice communications. The device may also include a video camera. Software on the machine that facilitates network communications is pre-installed, verified and tested by the service provider. The machine has some telephone functionality and some computer functionality, the combination. The machine may be stand-alone or may be networked to other computers.

The gateway machine is for company subscribers who have a large number of computers on a LAN, that do not wish to run twisted pair phone lines to each machine, and that feel that security up to the LAN is sufficient. An example of such a customer may be a company that uses many remote contractors for outsourcing code development. The company doesn't want their source code to go anywhere near the Internet, but they trust the LAN in their building. In such case, a gateway machine is leased to such a customer. Another example is the electronic commerce vendor who wants a LAN fed by a dynamic manifest network. The gateway machine will have one or more PRI connections on one side, and an Ethernet connection on the other side. Small volume customers may opt for ISDN or ADSL instead of PRI. Mail is still delivered directly to the user, but it may cross over the LAN along the way. This machine is similar to the secure machine described in the previous paragraph, as it will only provide a login shell at the console, the login shell providing limited functionality. Mail is not queued on the machine, but only passes through it. Thus receipt and time of receipt of orders and mail may still be verified.

The dedicated interface unit takes the place of an ISDN router, ADSL router, SDSL router or other communication interface. The dedicated interface unit includes a computer (or LAN) interface and facilities the communication network described herein. The dedicated interface unit may include disk storage upon which the client software resides and upon which sensitive documents may be stored.

The metanet software may be sold as a product and installed upon a customer machine. In such case, the metanet software employs whatever resources the host computer has for communicating according to the present invention. For example, the metanet software may be installed upon a laptop PC and used to facilitate a network for a traveling employee. In such case, the metanet software employs a modem (or other available communication device) to communicate with other network members.

Email

Email is the simplest service provided by the metanet software. The user composes his message in one of several ways, the most common two being an HTML editor and Microsoft Word. He/she then opens the dynamic network application. He chooses recipients from his address book, and he chooses some options for delivery priority and verification of receipt logging if he doesn't like the defaults. He/she then drops the mail into the mailer. A window appears on the screen keeps the user comprised of the status of sending the message. For an added expense the user may chose to attempt immediate delivery instead of delayed delivery. The amount of the added expense follows the tariff rules, but is set by the contacted network member. The sender of the mail is informed of successful mail delivery, and a local log is kept of all mail sent and the delivery times. Optionally the user may log just signatures instead of whole messages.

There is no charge above the subscription fee for the synchronous mail service. As noted, for some destinations there may be a charge for immediate delivery of mail as this form causes the maximum bandwidth needed for smooth service to go up. A receiver may even disallow immediate mail. This fee structure allows the use of bandwidth to be reflected in charges, and thus allows network growth to be funded in just the places more performance is being demanded by the users. If there is a fee or a block for direct mail, the network member software informs the user of this before the mail is sent.

The network friend keeps a hierarchical database of network member addresses. Along with the addresses are rules that say who each network member wishes to have his address given to and under what conditions. Periodically the network member software calls the network friend, and is given his/her view of this information. Thus address books are kept up to date, etc. Also, yellow page information may be downloaded and then kept up to date, in case the network member is searching for a product or service instead of a network member address.

E-Ordering

E-ordering is a mail based service where the messages follow a strict format such as EDI. The format is called the order form. Order forms may be obtained through the network friend. The user runs a program to fill out the form, and then he/she mails it to the vendor. Since the connection is established directly to the vendor, there is no opportunity for an intermediate machine to filter for credit card numbers etc. The transaction is safe relative to the conventional model, completion of delivery of the order is verified, and a log entry on the local network member contains a signature of the order and the time it was made. Thus businesses can actually use the dynamic network of the present invention without changing their conventional model of doing business.

Point to Point Video-Phone

Because the dynamic network connections are direct, there are no latency issues with real time data. Also ISDN provides sufficient bandwidth for video phone. Since the typical network member machine has two ports, it will be possible for a network member to answer a second call, this second call may have be a mail delivery attempt, or another type of transaction. If the transaction is short, the network member may allow it. If the transaction is long, then the caller will be given a suggested backoff rule, which will tell caller when to try back. Otherwise the network member may just give the second call a busy tone. Particularly busy sites may want to install more ports. The protocol used for exchange of information during a video phone call is structured, similar to HTML, so that text, graphic primitives, still images, etc may be embedded.

Interactive Video

This is a mode related to video phone, but the video is sent in one direction. Keystrokes and location of the mouse pointer may be sent in the other direction; thus allowing the video feed to be interactive. The video is compressed in a form to allow the clear rendering of letters and drawing primitives.

Teleconferencing

The dynamic network of the present invention is capable of supporting existing protocols for teleconferencing. According to such teleconferencing, it is possible for network members on the network to share a multipoint control unit (MCU). With this conventional technique, participants link up with the MCU, and then participate in a teleconference call. The MCU may be owned by either, the subscriber or by the service provider directly. In the case that a subscriber opts to use the service provider MCU, he/she will reserve a block of time for a fee. The MCU will then only answer calls from the people who have reserved the unit at the given time. During slack times the MCU may be made available for group game playing at no additional cost for local callers, and telephone costs to long distance callers.

Telepresence

Telepresence was introduced in U.S. Serial No. 60/084,560, filed by Thomas W. Lynch on May 6, 1998 and continued as application U.S. Ser. No. 09/306,313, filed May 6, 1999. In a telepresence application, all telecommuters in a company have dedicated ports to an MCU. Each telecommuter runs virtual office software. This application places a window on a machine, or replaces the background, with a view of a virtual office. Each telecommuter has a camera and microphone in their office. The software transforms the image coming from the camera into a placard and places that placard into the virtual office. A placard resembles a poster or a painting—except that the image in it is updated in real time. The virtual office is rendered in 3D. Multiple computer monitors may be so that the virtual office image may be spread across them. All versions of Unix, and Windows 98 support the simultaneous use of multiple computer monitors.

When a user looks into the virtual office he sees rooms and hallways. A user may navigate through this virtual office and go to a break room, a conference room, or another office, for example. If user A goes to the office of user B, then user B will see and hear in his view of the virtual office the arrival of user A. Also, user A will see and hear user B at his desk. Thus it is possible for users to have impromptu meetings. Also, it is possible for bosses to have an idea of who works and when they work. Similarly it will be possible for large meetings to occur, where placards of people are seen distributed around a virtual conference room. At anytime, participants in a virtual room may switch to conventional videoconference format.

Distributed Project Software

The present invention may also be employed to safely share large amounts of data at low bandwidth at great distances. The technical insight is based upon a computing concept called symbiosis, disclosed generally in U.S. Ser. No. 60/085,421, filed by Thomas W. Lynch on May 13, 1998 and continued as application U.S. Ser. No. 09/310,508, filed May 12, 1999, and incorporated herein in its entirety. Accordingly to a simplified view, nearly exact duplicates of data are created at every participant's site. The lowest bandwidth elements are transferred from site to site, this will often be tokenstroke data. Accordingly, for example on a large software project each site will have all the source code available, so large amounts of code will never have to be transferred in real time. Only the commands used to manipulate the data need be transferred between sites. (These commands may be thought of as rules, as described in the previous section.)

For example, if users A, B, and C are developing code together and user A compiles a module, then the same compilation command is sent to users B and C. Alternatively, commands may be collected and sent when a module is checked back into a source tree. In this way the data remains in a consistent state—but the source code does not travel over the network. An eavesdropper would have a truly difficult time trying to recover any source code from listening to a window of network communication.

Signature Registration

In order to support both electronic commerce and telecommuting, the dynamic network of the present invention may support the archival of time stamped digital signatures or whole documents. A certified archive database may be distributed over the network friends. Entry of signatures in the database may be done during a configuration update (which occurs approximately once a day), or on demand. Registered documents will be physically removed from the network friend database daily and placed in storage. Thus there will be no electronic means to alter the information in storage.

Yellow Pages and Credit Ratings

The network friend will support a yellow pages service so that customer may identify new vendors. Vendors will pay to subscribe to the yellow pages service. Part of the configuration database will support an electronic credit rating service. This way both vendors and customers can have an idea of the track record of the people they are dealing with.

In view of the above detailed description of the present invention and associated drawings, other modifications and variations will now become apparent to those skilled in the art. It should also be apparent that such other modifications and variations may be effected without departing from the spirit and scope of the present invention as set forth in the claims which follow.

What is claimed is:

1. A client communication device that operates within a dynamically configured computer network, the dynamically configured computer network supporting communications among a plurality of network members via a communication network according to a metanetwork definition, the client communication device comprising:

a network interface that couples the client communication device to a communication network;

a processor coupled to the network interface;

a memory coupled to the processor that stores a plurality of software instructions for execution by the processor, the plurality of software instructions cause the client communication device to:

obtain a local view of the metanetwork definition, the local view describing:
   a set of network members of the plurality of network members with which the client communication device may communicate;
   for each network member of the set of network members of the plurality of network members with which the client communication device may communicate, at least one contact number with which the client communication device may contact the network member;
   for each network member of the set of network members of the plurality of network members with which the client communication device may communicate, a respective time interval during which the client communication device may communicate with the network member; and
   for each network member of the set of network members of the plurality of network members with which the client communication device may communicate, authentication information with which the client communication device may authenticate the network member;
process the local view to determine when and how links may be established with the set of network members of the plurality of network members;
establish a link with another network member of the set of network members of the plurality of network members based upon a respective contact number and a respective time interval for the another network member that are contained in the local view;
authenticate the identity of the another network member based upon respective authentication information contained in the local view; and
exchange electronic information with the another network member across the link.

2. The client communication device of claim 1, wherein the plurality of software instructions further cause the client communication device to:
   establish a link to a network friend;
   identify a particular metanetwork; and
   download a local view of the metanetwork definition.

3. The client communication device of claim 1, wherein the plurality of software instructions further cause the client communication device to:
   establish a link to a network friend;
   request formation of the dynamically configured computer network; and
   interact with the network friend to initiate formation of the dynamically configured computer network.

4. The client communication device of claim 1, further comprising:
   a display;
   at least one user input device; and
   a port that allows the client communication device to couple to peripheral devices.

5. The client communication device of claim 1, further comprising a voice interface that allows a user to use the client communication device for voice communications.

6. The client communication device of claim 1, wherein the plurality of software instructions further cause the client communication device to:
   interact with the another network member to establish encryption/decryption rules; and
   exchange electronic information with the other network member across the link according to the encryption/decryption rules.

7. The client communication device of claim 1, wherein the link is established across the Public Switched Telephone Network.

8. The client communication device of claim 1, further comprising a video camera that facilitates video teleconferencing.

9. The client communication device of claim 1, further comprising a docking station interface that allows the client communication device to be communicatively coupled to a docking station.

10. The client communication device of claim 1, further comprising a packet switched network interface that allows the client communication device to be coupled to a packet switched network.

11. The client communication device of claim 10, wherein the plurality of software instructions further cause the client communication device to limit access to the client communication device by the network interface.

12. The client communication device of claim 1, further comprising a storage device upon which the software instructions and other data is stored.

13. A method for operating a client communication device within a dynamically configured computer network, the dynamically configured computer network supporting communications among a plurality of network members via a communication network according to a metanetwork definition, the method comprising:
   coupling the client communication device to a communication network;
   obtaining a local view of the metanetwork definition, the local view describing:
      a set of network members of the plurality of network members with which the client communication device may communicate;
      for each network member of the set of network members of the plurality of network members with which the client communication device may communicate, at least one contact number with which the client communication device may contact the network member;
      for each network member of the set of network members of the plurality of network members with which the client communication device may communicate, a respective time interval during which the client communication device may communicate with the network member; and
      for each network member of the set of network members of the plurality of network members with which the client communication device may communicate, authentication information with which the client communication device may authenticate the network member;
   processing the local view to determine when and how links may be established with the set of network members of the plurality of network members;
   establishing a link with another network member of the set of network members of the plurality of network members based upon a respective contact number and a respective time interval for the another network member that are contained in the local view;
   authenticating the identity of the another network member based upon respective authentication information contained in the local view; and exchanging electronic information with the another network member across the link.

14. The method of claim 13, further comprising:

establishing a link to a network friend;

identifying a particular metanetwork; and downloading a local view of the metanetwork definition.

15. The method of claim 13, further comprising:

establishing a link to a network friend;

requesting formation of the dynamically configured computer network; and interacting with the network friend to initiate formation of the dynamically configured computer network.

16. The method of claim 13, further comprising:

interacting with the another network member to establish encryption/decryption rules; and exchanging electronic information with the other network member across the link according to the encryption/decryption rules.

17. The method of claim 13, wherein the link is established across the Public Switched Telephone Network.

18. A computer readable medium providing storage for software instructions executable by a client communication device within a dynamically configured computer network, the dynamically configured computer network supporting communications among a plurality of network members via a communication network according to a metanetwork definition, the computer readable medium comprising:

a plurality of instructions that, upon execution by the client communication device, cause the client communication device to couple the client communication device to a communication network;

a plurality of instructions that, upon execution by the client communication device, cause the client communication device to obtain a local view of the metanetwork definition, the local view describing:

a set of network members of the plurality of network members with which the client communication device may communicate;

for each network member of the set of network members of the plurality of network members with which the client communication device may communicate, at least one contact number with which the client communication device may contact the network member;

for each network member of the set of network members of the plurality of network members with which the client communication device may communicate, a respective time interval during which the client communication device may communicate with the network member; and for each network member of the set of network members of the plurality of network members with which the client communication device may communicate, authentication information with which the client communication device may authenticate the network member;

a plurality of instructions that, upon execution by the client communication device, cause the client communication device to process the local view to determine when and how links may be established with the set of network members of the plurality of network members;

a plurality of instructions that, upon execution by the client communication device, cause the client communication device to establish a link with another network member of the set of network members of the plurality of network members based upon a respective contact number and a respective time interval for the another network member that are contained in the local view;

a plurality of instructions that, upon execution by the client communication device, cause the client communication device to authenticate the identity of the another network member based upon respective authentication information contained in the local view; and a plurality of instructions that, upon execution by the client communication device, cause the client communication device to exchange electronic information with the another network member across the link.

19. The computer readable medium of claim 18, further comprising:

a plurality of instructions that, upon execution by the client communication device, cause the client communication device to establish a link to a network friend;

a plurality of instructions that, upon execution by the client communication device, cause the client communication device to identify a particular metanetwork; and a plurality of instructions that, upon execution by the client communication device, cause the client communication device to download a local view of the metanetwork definition.

20. The method of claim 18, further comprising:

a plurality of instructions that, upon execution by the client communication device, cause the client communication device to establish a link to a network friend;

a plurality of instructions that, upon execution by the client communication device, cause the client communication device to request formation of the dynamically configured computer network; and a plurality of instructions that, upon execution by the client communication device, cause the client communication device to interact with the network friend to initiate formation of the dynamically configured computer network.

* * * * *